(12) United States Patent
Uozumi et al.

(10) Patent No.: US 11,912,796 B2
(45) Date of Patent: Feb. 27, 2024

(54) OLEFIN POLYMER AND METHOD FOR PRODUCING OLEFIN POLYMER

(71) Applicant: TOHO TITANIUM CO., LTD., Chigasaki (JP)

(72) Inventors: Toshiya Uozumi, Chigasaki (JP); Tetsuya Morioka, Chigasaki (JP); Keiichi Kurosaki, Chigasaki (JP); Teppei Ishikawa, Chigasaki (JP)

(73) Assignee: TOHO TITANIUM CO., LTD., Yokohama (JP)

( * ) Notice: Subject to any disclaimer, the term of this patent is extended or adjusted under 35 U.S.C. 154(b) by 311 days.

(21) Appl. No.: 16/977,599

(22) PCT Filed: Jan. 25, 2019

(86) PCT No.: PCT/JP2019/002492
§ 371 (c)(1),
(2) Date: Sep. 2, 2020

(87) PCT Pub. No.: WO2019/202800
PCT Pub. Date: Oct. 24, 2019

(65) Prior Publication Data
US 2021/0040245 A1 Feb. 11, 2021

(30) Foreign Application Priority Data

Apr. 20, 2018 (JP) ................................ 2018-081120
Apr. 20, 2018 (JP) ................................ 2018-081121

(51) Int. Cl.
| | | |
|---|---|---|
| *C08F 210/06* | (2006.01) | |
| *C08F 10/06* | (2006.01) | |
| *C08F 2/00* | (2006.01) | |
| *C08F 4/656* | (2006.01) | |
| *C08F 297/08* | (2006.01) | |
| *C08F 4/658* | (2006.01) | |
| *C08F 4/657* | (2006.01) | |

(52) U.S. Cl.
CPC ............ *C08F 10/06* (2013.01); *C08F 210/06* (2013.01); *C08F 297/08* (2013.01); *C08F 2/001* (2013.01); *C08F 4/656* (2013.01); *C08F 4/657* (2013.01); *C08F 4/658* (2013.01)

(58) Field of Classification Search
CPC ...... C08F 10/06; C08F 110/06; C08F 210/06; C08F 2/001; C08F 4/656; C08F 4/6586; C08F 4/6578; C08F 4/6565; C08F 4/6426
See application file for complete search history.

(56) References Cited

U.S. PATENT DOCUMENTS

| | | | | |
|---|---|---|---|---|
| 5,652,303 A | * | 7/1997 | Ishimaru | C08F 297/08 526/904 |
| 5,844,046 A | * | 12/1998 | Ohgizawa | C08F 10/00 525/247 |
| 6,111,039 A | * | 8/2000 | Miro | C08F 10/00 526/348.3 |
| 8,822,602 B2 | * | 9/2014 | Leskinen | C08F 110/06 525/240 |
| 9,023,906 B2 | * | 5/2015 | Okamoto | C08L 23/14 525/232 |
| 9,068,030 B2 | | 6/2015 | Song et al. | |
| 9,453,093 B2 | * | 9/2016 | Meka | H01B 1/20 |
| 9,550,844 B2 | * | 1/2017 | Gahleitner | C08L 23/12 |
| 9,605,096 B2 | * | 3/2017 | Edwards | C08F 10/00 |
| 2003/0149196 A1 | | 8/2003 | Streeky et al. | |
| 2011/0034651 A1 | * | 2/2011 | O'Reilly | C08F 10/00 502/103 |
| 2018/0371224 A1 | * | 12/2018 | Degenhart | C08K 5/14 |
| 2020/0199274 A1 | * | 6/2020 | Hosaka | C08F 10/06 |

FOREIGN PATENT DOCUMENTS

| | | | | |
|---|---|---|---|---|
| CN | 1090854 A | | 8/1994 | |
| CN | 102532381 A | | 7/2012 | |
| CN | 102816271 A | * | 12/2012 | ............ C08F 210/06 |
| CN | 103201339 A | | 7/2013 | |
| CN | 105622809 A | * | 6/2016 | ............ C08F 110/06 |

(Continued)

OTHER PUBLICATIONS

CN 105622809 A (Jun. 1, 2016), Bi, Fuyong et al.; machine translation. (Year: 2016).*
JP 2007-326887 A (Dec. 10, 2007); machine translation. (Year: 2007).*
WO 2019/144976 (Aug. 1, 2019); machine translation. (Year: 2019).*
CN 102816271 (Dec. 12, 2012); machine translation. (Year: 2012).*
Office Action dated Apr. 26, 2022, issued in counterpart TW Application No. 108107278. (15 pages).
Extended (Supplementary) European Searcch Report dated Jan. 4, 2022, issued in counterpart EP Application No. 19788706.0. (7 pages).
International Search Report dated Apr. 16, 2019, issued in counterpart International Application No. PCT/ JP2019/002492. (2 pages).
Office Action dated Mar. 10, 2022, issued in counterpart IN Application No. 202017039962, with English Translation. (7 pages).
Office Action dated May 31, 2023, issued in counterpart CN Application No. 201980027098.0. (5 pages).

*Primary Examiner* — Rip A Lee
(74) *Attorney, Agent, or Firm* — WHDA, LLP

(57) ABSTRACT

Provided is a novel olefin polymer which is excellent in lightness and moldability, has high rigidity and yields molded products excellent in flexural elasticity. The olefin polymer includes a propylene initial polymerization product formed in the presence of an olefin polymerization catalyst which is a contact reaction product of an olefin polymerization solid catalyst component containing a titanium atom, a magnesium atom, a halogen atom and an internal electron donating compound, at least one organoaluminum compound selected from the compounds of the general formula (I), and a first external electron donating compound; and a polypropylene part formed of a propylene polymerization product formed in the presence of the olefin polymerization catalyst and a second external electron donating compound higher in adsorption to the surface of the olefin polymerization solid catalyst component than the first external electron donating compound.

7 Claims, No Drawings

(56) References Cited

FOREIGN PATENT DOCUMENTS

| | | |
|---|---|---|
| EP | 0 601 496 A1 | 6/1994 |
| JP | 5-170843 A | 7/1993 |
| JP | H05-170843 A | 7/1993 |
| JP | 6-220116 A | 8/1994 |
| JP | 10-130280 A | 5/1998 |
| JP | 2000-17019 A | 1/2000 |
| JP | 2000-186109 A | 7/2000 |
| JP | 2005-256002 A | 9/2005 |
| JP | 2007-326887 A * | 12/2007 ............ C08F 4/658 |
| JP | 2016-527327 A | 9/2016 |
| JP | 2019-11466 A | 1/2019 |
| WO | WO 2019/144976 A2 * | 8/2019 |

* cited by examiner

OLEFIN POLYMER AND METHOD FOR PRODUCING OLEFIN POLYMER

TECHNICAL FIELD

The present invention provides a novel olefin polymer, and a method for producing the olefin polymer.

BACKGROUND ART

Polypropylene-based resin compositions are lightweight and excellent in moldability, yield molded products excellent in chemical stability such as heat resistance and chemical resistance, have very good cost performance, and are therefore used in many fields as one of the most important plastic materials. For example, polypropylene having high stereoregularity is being studied for use for various purposes because the polypropylene is excellent in mechanical strength, thermal properties and the like.

In the course of further expansion of uses, polypropylene and propylene-based polymers such as propylene-based block copolymers have come to be desired which can be used as a replacement for polystyrene and ABS resin and which have excellent moldability and high rigidity.

For improving moldability, polymers excellent in melt flow rate (MFR), and polymers excellent in linear viscoelasticity with high complex viscosity exhibited at a low angular frequency and low complex viscosity exhibited at a high angular frequency are preferred, and it is widely known that as these polymers, for example, polymers having a broad molecular weight distribution are suitable.

On the other hand, it is widely known that for polypropylene molded articles to have high rigidity, highly stereoregular polymers having a small amount of components soluble in xylene are preferable.

For methods for obtaining polypropylene having a broad molecular weight distribution and hence good moldability, for example, Patent Literature 1 (Japanese Patent Laid-Open No. 2000-017019) and Patent Literature 2 (Japanese Translation of PCT International Application Publication No. 2016-527327) suggest methods in which multistage polymerization is performed using a plurality of polymerization reactors. By these polymerization methods, polymers having a broad molecular weight distribution (Mw/Mn) and a large ratio between complex viscosity η* at 0.05 radians/sec and complex viscosity η* at 300 radians/sec can be obtained, but these polymers have a large amount of xylene-soluble components and can hardly be said to have high rigidity.

Patent Literature 3 (Japanese Translation of PCT International Application Publication No. 2005-256002) suggests a method in which two or more catalysts are mixed or combined to obtain a polymer having a broad molecular weight distribution, and polymers obtained by this method have a broad apparent molecular weight distribution, but have a low melting point, low rigidity and poor heat resistance.

Further, Patent Literature 4 (Japanese Patent Laid-Open No. 10-130280) and Patent Literature 5 (Japanese Patent Laid-Open No. 2007-326887) suggest methods in which a specific silicon compound is used during polymerization to obtain a polymer having a broad molecular weight distribution, and in this case, polymers obtained have a broad molecular weight distribution, but there is the problem that the amount of xylene-soluble components increases and rigidity deteriorates.

Patent Literature 6 (U.S. Patent Application Publication No. 2003/0149196) suggests a method in which a catalyst system containing a titanium-containing component supported on a magnesium halide, a first external electron donor such as tetraethoxysilane, and a second electron donor having stereoregularity higher than that of the first external electron donor, such as dicyclopentyldimethoxysilane, are injected, respectively, at specific injection positions in a polymerization reactor stream. Such a method enables production of polymers having a broad molecular weight distribution, a high MFR and high stereoregularity, but is required to be further improved.

CITATION LIST

Patent Literature

[Patent Literature 1] Japanese Patent Laid-Open No. 2000-017019
[Patent Literature 2] Japanese Translation of PCT International Application Publication No. 2016-527327
[Patent Literature 3] Japanese Translation of PCT International Application Publication No. 2005-256002
[Patent Literature 4] Japanese Patent Laid-Open No. 10-130280
[Patent Literature 5] Japanese Patent Laid-Open No. 2007-326887
[Patent Literature 6] U.S. Patent Application Publication No. 2003/0149196

SUMMARY OF INVENTION

Technical Problem

Thus, with conventionally known methods, it is not possible to obtain polypropylene and propylene-based polymers such as propylene-based block copolymers which can satisfy all of properties of being high in melt flow rate (MFR) as an index of moldability, large in complex viscosity ratio, hence broad in molecular weight distribution, and low in xylene-soluble component (XS) content as an index of high rigidity.

Under these circumstances, an object of the present invention is to provide a novel olefin polymer which is excellent in lightness and moldability, has high rigidity, and yields molded products excellent in flexural elasticity; and a method for producing the olefin polymer.

Solution to Problem

In view of these circumstances, the present inventors have extensively conducted studies, and resultantly found that the above-described technical problems can be solved by using a novel production method to produce an olefin polymer comprising a propylene initial polymerization product formed in the presence of an olefin polymerization catalyst which is a contact reaction product of an olefin polymerization solid catalyst component containing a titanium atom, a magnesium atom, a halogen atom and an internal electron donating compound, at least one organoaluminum compound selected from the compounds of the general formula (I), and a first external electron donating compound; and a polypropylene part formed of propylene polymerization product formed in the presence of the olefin polymerization catalyst and a second external electron donating compound higher in adsorption to the surface of the olefin polymerization solid catalyst component than the first external electron donating compound. On the basis of this finding, the present invention has been completed.

Specifically, the present invention provides:
(1) an olefin polymer comprising:
a propylene initial polymerization product formed in the presence of an olefin polymerization catalyst which is a contact reaction product of:
an olefin polymerization solid catalyst component containing a titanium atom, a magnesium atom, a halogen atom and an internal electron donating compound,
at least one organoaluminum compound selected from the compounds of the general formula (I):

$$R^1_p AlQ_{3-p} \quad (I)$$

(wherein $R^1$ is an alkyl group having 1 to 6 carbon atoms, Q is a hydrogen atom or a halogen atom, p is a real number of more than 0 and not more than 3, $R^1$s may be the same or different when two or more $R^1$s exist, and Qs may be the same or different when two or more Qs exist), and
a first external electron donating compound; and
a polypropylene part formed of a propylene polymerization product formed in the presence of the olefin polymerization catalyst and a second external electron donating compound higher in adsorption to the surface of the olefin polymerization solid catalyst component than the first external electron donating compound;
(2) the olefin polymer according to (1), wherein the olefin polymer is polypropylene having:
(a) a melt flow rate of 10 g/10 min to 100 g/10 min;
(b) a content ratio of xylene-soluble components of 3.0 mass % or less; and
(c) a ratio of complex viscosity η* at an angular frequency of 300 radians/sec to complex viscosity η* at an angular frequency of 0.03 radians/sec of 8.5 or more;
(3) the olefin polymer according to (1), wherein the olefin polymer is a propylene-based block copolymer having:
(a) a melt flow rate is 1 g/10 min of 100 g/10 min;
(b) a content ratio of xylene-soluble components of 50 mass % or less; and
(c) a ratio of complex viscosity η* at an angular frequency of 300 radians/sec to complex viscosity η* at an angular frequency of 0.03 radians/sec of 10 or more.
(4) the olefin polymer according to (1) or (2), wherein the olefin polymer is polypropylene having a ratio of the weight average molecular weight Mw to the number average molecular weight Mn of 5.5 or more;
(5) the olefin polymer according to (1) or (3), wherein the olefin polymer is a propylene-based block copolymer having a ratio of the weight average molecular weight Mw to the number average molecular weight Mn of 5.5 or more;
(6) the olefin polymer according to (1) or (2), wherein the olefin polymer is polypropylene having a flexural modulus FM of 1650 MPa or more;
(7) the olefin polymer according to (1) or (3), wherein the olefin polymer is a propylene-based block copolymer having a flexural modulus FM of 1100 MPa or more;
(8) a method for producing an olefin polymer, comprising:
forming a propylene initial polymerization product in the presence of an olefin polymerization catalyst which is a contact reaction product of:
an olefin polymerization solid catalyst component containing a titanium atom, a magnesium atom, a halogen atom and an internal electron donating compound,
at least one organoaluminum compound selected from the compounds of the general formula (I):

$$R^1_p AlQ_{3-p} \quad (I)$$

(wherein $R^1$ is an alkyl group having 1 to 6 carbon atoms, Q is a hydrogen atom or a halogen atom, p is a real number of more than 0 and not more than 3, $R^1$s may be the same or different when two or more $R^1$s exist, and Qs may be the same or different when two or more Qs exist), and
a first external electron donating compound; and
further in forming a polypropylene part by further polymerizing the propylene,
adding a second external electron donating compound to the reaction system, the second external electron donating compound being higher in adsorption to the surface of the olefin polymerization solid catalyst component than the first external electron donating compound;
(9) the method for producing an olefin polymer according to (8), wherein the internal donating compound is one or more selected from dicarboxylic acid esters, diethers, decarbonates, ether carboxylic acid esters and ether carbonates;
(10) the method for producing an olefin polymer according to (8), wherein the first external electron donating compound is one or more selected from organosilicon compounds having a Si—C bond and aminosilane compounds having a Si—N—C bond, each of which is represented by the following general formula (II):

$$R^2 Si(OR^3)_3 \quad (II)$$

(wherein $R^2$ is an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms, or a dialkylamino group having 1 to 12 carbon atoms, $R^3$ is an alkyl group having 1 to 4 carbon atoms, a cycloalkyl group having 3 to 6 carbon atoms, a phenyl group, a vinyl group, an allyl group or an aralkyl group, and $R^3$s may be the same or different), or one or more selected from aminosilane compounds having a Si—N—C bond and represented by the following general formula (III):

$$R^4_2 Si(NR^5 R^6)(NR^7 R^8) \quad (III)$$

(wherein $R^4$ is an alkyl group having 1 to 12 carbon atoms, a vinyl group, an allyl group, an aralkyl group, a cycloalkyl group having 3 to 12 carbon atoms, or a phenyl group, $R^4$s may be the same or different, and $R^5$, $R^6$, $R^7$ and $R^8$ are each independently hydrogen, an alkyl group having 1 to 4 carbon atoms, a cycloalkyl group having 3 to 6 carbon atoms, a phenyl group, a vinyl group, an allyl group or an aralkyl group, and may be the same or mutually different);
(11) the method for producing an olefin polymer according to any one of (8) to (10), wherein the second external electron donating compound is one or more selected from silane compounds represented by the following general formula (IV):

$$R^9_2 Si(OR^{10})_2 \quad (IV)$$

(wherein $R^9$ is an alkyl group having 1 to 12 carbon atoms, a vinyl group, an allyl group, an aralkyl group, a cycloalkyl group having 3 to 12 carbon atoms, or a phenyl group, $R^{10}$ is an alkyl group having 1 to 4 carbon atoms, a cycloalkyl group having 3 to 6 carbon atoms, a phenyl group, a vinyl group, an allyl group or an aralkyl group, $R^9$s may be the same or different, and $R^{10}$'s may be the same or different);

(12) the method for producing an olefin polymer according to any one of (8) to (10), wherein the first external electron donating compound is one or more selected from phenyltrialkoxysilanes, alkyltrialkoxysilanes, cycloalkyltrialkoxysilanes, (alkylamino)trialkoxysilanes, (dialkylamino)trialkoxysilane, di(alkylamino)dialkylsilanes and di(dialkylamino)dialkylsilanes;

(13) the method for producing an olefin polymer according to any one of (8) to (11), wherein the second external electron donating compound is one or more selected from diphenyldialkoxysilanes, dialkyldialkoxysilanes, phenylalkyldialkoxysilanes, di(cycloalkyl)dialkoxysilanes and (cycloalkyl)alkyldialkoxysilanes;

(14) the method for producing an olefin polymer according to any one of (8) to (13), wherein an amount of the second external electron donating compound added is 0.1 to 10 mol per 1 mol of the first external electron donating compound added;

(15) the method for producing an olefin polymer according to any one of (8) to (14), wherein the second external electron donating compound is added in such a manner that a ratio of time for addition of the second external electron donating compound to a total polymerization time is 5 to 95%;

(16) the method for producing an olefin polymer according to any one of (8) to (15), wherein a resulting olefin polymer is polypropylene; and

(17) the method for producing an olefin polymer according to any one of (8) to (15), wherein the resulting olefin polymer is a propylene-based block copolymer.

Advantageous Effects of Invention

According to the present invention, it is possible to provide a novel olefin polymer which is excellent in lightness and moldability, has high rigidity, and yields molded products excellent in flexural elasticity; and a method for easily producing the olefin polymer.

DESCRIPTION OF EMBODIMENT

The olefin polymer according to the present invention comprises a propylene initial polymerization product formed in the presence of an olefin polymerization catalyst which is a contact reaction product of:
an olefin polymerization solid catalyst component containing a titanium atom, a magnesium atom, a halogen atom and an internal electron donating compound,
at least one organoaluminum compound selected from the compounds of the general formula (I):

$$R^1_p AlQ_{3-p} \qquad (I)$$

(wherein $R^1$ is an alkyl group having 1 to 6 carbon atoms, Q is a hydrogen atom or a halogen atom, p is a real number of more than 0 and not more than 3, $R^1$s may be the same or different when two or more $R^1$s exist, and Qs may be the same or different when two or more Qs exist), and
a first external electron donating compound; and
a polypropylene part formed of a propylene polymerization product formed in the presence of the olefin polymerization catalyst and a second external electron donating compound higher in adsorption to the surface of the olefin polymerization solid catalyst component than the first external electron donating compound.

(Olefin Polymerization Solid Catalyst Component)

In the polypropylene according to the present invention, the olefin polymerization solid catalyst component that forms the polymerization catalyst contains a titanium atom, a magnesium atom, a halogen atom and an internal electron donating compound.

Examples of the supply source (raw material) of the magnesium atom that forms the olefin polymerization solid catalyst component in the olefin polymerization catalyst include various magnesium compounds.

The magnesium compound is one or more that can be selected from magnesium dihalides, dialkylmagnesiums, alkylmagnesium halides, dialkoxymagnesiums, diaryloxymagnesiums, alkoxymagnesium halides, fatty acid magnesium and the like.

Of these magnesium compounds, dialkoxymagnesiums are preferable, and specific examples thereof include dimethoxymagnesium, diethoxymagnesium, dipropoxymagnesium, dibutoxymagnesium, ethoxymethoxymagnesium, ethoxypropoxymagnesium and butoxyethoxymagnesium, with diethoxymagnesium being especially preferable.

The dialkoxymagnesium may be one obtained by reacting metallic magnesium with an alcohol in the presence of a halogen, a halogen-containing metal compound or the like.

One of the magnesium compounds may be used alone, or two or more thereof may be used in combination.

The dialkoxymagnesium is preferably in a granular or powdered form, with an amorphous or spherical particle shape being suitable.

For example, when the magnesium compound is a spherical dialkoxymagnesium, polymer powder having a better particle shape (higher sphericity) and having a narrow particle size distribution can be easily obtained, handleability of generated polymer powder during polymerization operation is improved, and pipe obstruction caused by fine powder contained in the generated polymer powder, etc. can be easily suppressed.

The spherical dialkoxymagnesium is not necessarily required to have a perfectly spherical shape, and may have an elliptical shape or a potato shape. Specifically, the suitable shape of its particle is such that the circularity degree determined from the area S and the circumference length L of the particle is 3 or less, a circularity degree of 1 to 2 is more suitable, and a circularity degree of 1 to 1.5 is still more suitable.

In the present application, the circularity degree of the dialkoxymagnesium means an arithmetic average value obtained by photographing 500 or more dialkoxymagnesium particles with a scanning electron microscope, processing the photographed particles with image analysis software to determine the area S and the circumference length L of each particle, and calculating the circularity degree of each dialkoxymagnesium particle from the following expression:

The value of the circularity degree becomes closer to 1 as the circularity of the particle shape becomes higher.

The average particle diameter of the magnesium compound is preferably 1 to 200 μm, more preferably 5 to 150 μm.

When the magnesium compound is a spherical dialkoxymagnesium, the average particle diameter thereof is preferably 1 to 100 μm, more preferably 5 to 50 μm, still more preferably 10 to 40 μm.

In the present application, the average particle diameter of the magnesium compound means an average particle diameter $D_{50}$ (particle diameter at 50% of a cumulative particle size in a volume cumulative particle size distribution) as measured using a laser light scattering diffractometry particle size measuring apparatus.

Preferably, the magnesium compound has a narrow particle size distribution with low contents of fine powder and coarse powder.

Specifically, the content of particles having a particle size of 5 μm or less is preferably 20% or less, more preferably 10% or less.

On the other hand, the content of particles having a particle size of 100 μm or more is preferably 10% or less, more preferably 5% or less.

Further, the particle size distribution is preferably 3 or less, more preferably 2 or less, in terms of $\ln(D_{90}/D_{10})$ (where $D_{90}$ is a particle diameter at 90% of the cumulative particle size in the volume cumulative particle size distribution, and $D_{10}$ is a particle diameter at 10% of the cumulative particle size in the volume cumulative particle size distribution).

Methods for producing the spherical dialkoxymagnesium are shown in, for example, Japanese Patent Laid-Open No. 58-41832, Japanese Patent Laid-Open No. 62-51633, Japanese Patent Laid-Open No. 3-74341, Japanese Patent Laid-Open No. 4-368391, Japanese Patent Laid-Open No. 8-73388 and the like.

The magnesium compound is preferably in a solution form or a suspension form during reaction, and when the magnesium compound is in a solution form or a suspension form, the reaction can be made to suitably proceed.

When the magnesium compound is solid, a magnesium compound in a solution form can be obtained by dissolving the magnesium compound in a solvent having a magnesium compound solubilizing ability, or a magnesium compound suspension can be obtained by dispersing the magnesium compound in a solvent having no magnesium compound solubilizing ability.

When the magnesium compound is in a liquid form, it may be directly used as a magnesium compound in a liquid form, or a magnesium compound in a liquid form may be obtained by further dissolving the magnesium compound in a solvent having a magnesium compound solubilizing ability.

The compound capable of solubilizing a solid magnesium compound is at least one compound selected from the group consisting of alcohols, ethers and esters.

Specific examples thereof include alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, iso-propyl alcohol, iso-propylbenzyl alcohol and ethylene glycol; halogen-containing alcohols having 1 to 18 carbon atoms, such as trichloromethanol, trichloroethanol and trichlorohexanol; ethers having 2 to 20 carbon atoms, such as methyl ether, ethyl ether, iso-propyl ether, butyl ether, amyl ether, tetrahydrofuran, ethylbenzyl ether, dibutyl ether, anisole and diphenyl ether; and metallic acid esters such as tetraethoxytitanium, tetra-n-propoxytitanium, tetra-iso-propoxytitanium, tetrabutoxytitanium, tetrahexoxytitanium, tetrabutoxyzirconium and tetraethoxyzirconium. Of these, alcohols such as ethanol, propanol, butanol and 2-ethylhexanol are preferable, and 2-ethylhexanol is especially preferable.

On the other hand, a saturated hydrocarbon solvent or an unsaturated hydrocarbon solvent, in which a magnesium compound is not soluble, is used as a medium having no magnesium compound solubilizing ability. From the viewpoint of high safety and industrial versatility, specific examples of the saturated hydrocarbon solvent or the unsaturated hydrocarbon solvent include linear or branched aliphatic hydrocarbon compounds having a boiling point of 50 to 200° C., such as hexane, heptane, decane and methylheptane; cycloaliphatic hydrocarbon compounds having a boiling point of 50 to 200° C., such as cyclohexane, ethylcyclohexane and decahydronaphthalene; and aromatic hydrocarbon compounds having a boiling point of 50 to 200° C., such as toluene, xylene and ethylbenzene. Of these, linear aliphatic hydrocarbon compounds having a boiling point of 50 to 200° C., such as hexane, heptane and decane, and aromatic hydrocarbon compounds having a boiling point of 50 to 200° C., such as toluene, xylene and ethylbenzene are preferably used. One of these compounds may be used alone, or two or more thereof may be used in combination.

Examples of the halogen atom that forms the olefin polymerization solid catalyst component include atoms of fluorine, chlorine, bromine and iodine. Of these, a chlorine atom, a bromine atom or an iodine atom is preferable, and a chlorine atom or an iodine atom is especially preferable.

Examples of the supply source (raw material) of the titanium atom and the halogen atom that form the olefin polymerization solid catalysts component include various tetravalent titanium compounds.

The titanium halogen compound is not particularly limited, and examples thereof include tetravalent titanium compounds represented by the following general formula (V):

$$\text{Ti}(OR^{11})_q X_{4-q} \quad (V)$$

(wherein $R^{11}$ is a hydrocarbon group having 1 to 10 carbon atoms, $OR^{11}$ groups may be the same or different when two or more $OR^{11}$ groups exist, X is a halogen group, Xs may be the same or different when two or more Xs exist, and q is an integer of 1 to 4).

The tetravalent titanium compound represented by the general formula (V) is one or more selected from the group consisting of alkoxytitaniums, titanium halides and alkoxytitanium halides.

Specific examples thereof include titanium tetrahalides such as titanium tetrafluoride, titanium tetrachloride, titanium tetrabromide and titanium tetraiodide; and alkoxytitanium halides which are alkoxytitanium trihalides such as methoxytitanium trichloride, ethoxytitanium trichloride, propoxytitanium trichloride and n-butoxytitanium trichloride, dialkoxytitanium dihalides such as dimethoxytitanium dichloride, diethoxytitanium dichloride, dipropoxytitanium dichloride and di-n-butoxytitanium dichloride, and trialkoxytitanium halides such as trimethoxytitanium chloride, triethoxytitanium chloride, tripropoxytitanium chloride and tri-n-butoxytitanium chloride.

Of these, halogen-containing titanium compounds are preferably used, and titanium tetrahalides such as titanium tetrachloride, titanium tetrabromide and titanium tetraiodide are preferable, with titanium tetrachloride being especially preferable.

One of these titanium compounds may be used alone, or two or more thereof may be used in combination. The tetravalent titanium compound represented by the general formula (V) may be used in a state of being diluted with a hydrocarbon compound, a hydrocarbon halide compound or the like.

In the method for producing an olefin polymer according to the present invention, the supply source (raw material) of the halogen atom that forms the solid catalyst component may be a halogen compound other than the tetravalent titanium compounds.

Examples of the halogen compound include tetravalent halogen-containing silicon compounds, and more specific examples thereof include silane tetrahalides such as tetrachlorosilane (silicon tetrachloride) and tetrabromosilane, and alkoxy group-containing silane halides such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane and tri-n-butoxychlorosilane.

Examples of the internal electron donating compound that forms the olefin polymerization solid catalyst component include organic compounds containing an oxygen atom or a nitrogen atom, such as alcohols, phenols, ethers, carbonates, esters, ketones, acid halides, acid amides, nitriles, isocyanates and acid anhydrides.

Of the above-described compounds, compounds having one or more groups selected from ester groups, carbonate groups and ether groups are preferable; monoethers having one ether group, diethers having two ether groups or a fluorene structure, ether-carboxylic acid esters having one ether group and one ester residue, ether-carbonates having one ether group and one carbonate group, carbonate-esters having one carbonate group and one ester residue, dicarbonates having two carbonate groups, monocarboxylic esters having one ester residue, and dicarboxylic acid diesters and diol esters having two ester residues are more preferable; monoethers such as diethyl ether, dipropyl ether, dibutyl ether, diamyl ether and diphenyl ether, diethers such as 2,2-isobutyl-1,3-dimethoxypropane and 9,9-bis(methoxymethyl)fluorene, ether-carboxylic acid esters such as 3-ethoxy-2-isopropylpropionic acid ester, 3-ethoxy-2-isobutylpropionic acid ester, 3-ethoxy-2-tert-butylpropionic acid ester, 3-ethoxy-2-tert-pentylpropionic acid ester, 3-ethoxy-2-cyclohexylpropionic acid ester and 3-ethoxy-2-cyclopentylpropionic acid ester, ether carbonates such as 2-alkoxyethylmethyl carbonate and 2-benzyloxyethylphenyl carbonate, aliphatic monocarboxylic acid esters such as formic acid esters, acetic acid esters, propionic acid esters and butyric acid esters, aromatic monocarboxylic acid esters such as benzoic acid esters, p-toluic acid esters and anisic acid esters, aliphatic dicarboxylic acid diesters such as malonic acid diesters, dialkylmalonic acid diesters, succinic acid diesters, dialkylsuccinic acid diesters, maleic acid diesters, glutaric acid diesters and vinylidenemalonic acid diesters, cycloaliphatic dicarboxylic acid diesters such as cycloalkanedicarboxylic acid diesters and cycloalkenedicarboxylic acid diesters, aromatic dicarboxylic acid diesters such as phthalic acid diesters and benzylidenemalonic acid diesters, and diol esters such as 2,4-pentanediol dibenzoate, 3-methyl-2,4-pentanediol dibenzoate and 3-methyl-5-tert-butyl-1,2-phenylene dibenzoate are still more preferable; and 1,3-diethers such as 2-isopropyl-2-isopentyl-1,3-dimethoxypropane, 2-isopropyl-2-isobutyl-1,3-dimethoxypropane and 9,9-bis(methoxymethyl)fluorene, ether-carboxylic acid esters such as ethyl 3-ethoxy-2-tert-butylpropionate and ethyl 3-ethoxy-2-tert-pentylpropionate, ether carbonates such as (2-ethoxyethyl)methyl carbonate, (2-ethoxyethyl) ethyl carbonate, (2-propoxyethyl)ethyl carbonate, (2-butoxyethyl) ethyl carbonate, (2-ethoxyethyl)phenyl carbonate and (2-ethoxyethyl)p-methylphenyl carbonate, aliphatic dicarboxylic acid diesters such as dimethyl diisobutylmalonate, diethyl diisobutylmalonate, diethyl 2,3-diisopropylsuccinate and diethyl maleate, cycloaliphatic dicarboxylic acid diesters such as diethyl cyclohexane-1,2-dicarboxylate, di-n-propyl cyclohexane-1,2-dicarboxylate, di-n-butyl cyclohexane-1,2-dicarboxylate, diethyl 1-cyclohexene-1,2-dicarboxylate, di-n-propyl 1-cyclohexene-1,2-dicarboxylate, di-n-butyl 1-cyclohexene-1,2-dicarboxylate, diethyl 4-cyclohexene-1,2-dicarboxylate and di-n-butyl 4-cyclohexene-1,2-dicarboxylate, and aromatic dicarboxylic acid esters such as diethyl phthalate, di-n-propyl phthalate, di-n-butyl phthalate, diisobutyl phthalate, diethyl benzylidenemalonate and di-n-butyl benzylidenemalonate.

The olefin polymerization solid catalyst component may be one containing polysiloxane. When the olefin polymerization solid catalyst component contains polysiloxane, the stereoregularity or crystallinity of generated polypropylene can be easily improved, and the amount of fine powder in generated polypropylene can be easily reduced.

The polysiloxane means chainlike, partially hydrogenated, cyclic or modified polysiloxane which is a polymer having a siloxane bond (—Si—O— bond) on the main chain, is collective called silicone oil, has a viscosity at 25° C. of preferably 0.02 to 100 $cm^2/s$ (2 to 10000 centistokes), more preferably 0.03 to 5 $cm^2/s$ (3 to 500 centistokes), and is liquid or viscous at normal temperature.

Examples of the chainlike polysiloxane include dimethylpolysiloxane and methylphenylpolysiloxane, examples of the partially hydrogenated polysiloxane include methylhydrogenpolysiloxane having a hydrogenation ratio of 10 to 80%, and examples of the cyclic polysiloxane include hexamethylcyclotrisiloxane, octamethylcyclotrisiloxane, decamethylcyclopentasiloxane, 2,4,6-trimethylcyclotrisiloxane and 2,4,6,8-tetramethylcyclotetrasiloxane.

The content ratio of each of the titanium atom, the magnesium atom, the halogen atom and the internal electron donating compound in the olefin polymerization solid catalyst component is not particularly limited. The content ratio of the titanium atom is preferably 0.1 to 10 mass %, more preferably 0.5 to 8.0 mass %, still more preferably 1.0 to 8.0 mass %, the content ratio of the magnesium atom is preferably 10 to 70 mass %, more preferably 10 to 50 mass %, still more preferably 15 to 40 mass %, furthermore preferably 15 to 25 mass %, the content ratio of the halogen atom is preferably 20 to 90 mass %, more preferably 30 to 85 mass %, still more preferably 40 to 80 mass %, furthermore preferably 45 to 75 mass %, and the content ratio of the internal electron donating compound is preferably 0.5 to 40 mass %, more preferably 1 to 30 mass %, still more preferably 2 to 25 mass %.

The average particle diameter of the olefin polymerization solid catalyst component is preferably 1 to 100 μm, more preferably 3 to 80 μm, still more preferably 5 to 70 μm.

When the average particle diameter of the solid catalyst component is within the above-described range, the catalyst component can be easily used in various polymerization processes.

In the present application, the average particle diameter of the olefin polymerization solid catalyst component means an average particle diameter $D_{50}$ (particle diameter at 50% of a cumulative particle size in a volume cumulative particle size distribution) as measured using a laser light scattering diffractometry particle size measuring apparatus.

The olefin polymerization solid catalyst component can be prepared by bringing the magnesium compound, the titanium compound, a halogen compound other than the titanium compound if necessary, and the internal electron donating compound into contact with one another.

Examples of the method for preparing the olefin polymerization solid catalyst component include a method in which a solid magnesium compound having no reducing property, an internal electron donating compound and a titanium halide compound are co-pulverized; a method in which a magnesium halide compound having an adduct such as an alcohol, an internal electron donating compound and a titanium halide are brought into contact with one another in the presence of an inert hydrocarbon solvent; a method in which a dialkoxymagnesium, an internal electron donating compound and a titanium halide compound are brought into contact with one another in the presence of an inert hydrocarbon solvent; and a method in which a magnesium compound having a reducing property, an internal electron donating compound and a titanium halide are brought into contact with one another to precipitate an olefin polymerization solid catalyst.

As specific methods for preparing the olefin polymerization solid catalyst component (A), preparation methods (1) to (16) will be shown below.

The following preparation methods (1) to (16) may be carried out in the presence of, for example, other reaction reagents such as silicon, phosphorus and aluminum, and surfactants.

(1) A magnesium halide is dissolved in an alkoxytitanium compound, an organosilicon compound is then brought into contact therewith to obtain a solid product, the solid product is reacted with a titanium halide, and an internal electron donating compound is brought into contact reaction with the reaction product to prepare an olefin polymerization solid catalyst component. Here, further the olefin polymerization solid catalyst component may be subjected to preliminary polymerization treatment with an organoaluminum compound, an organosilicon compound and an olefin.

(2) A magnesium halide and an alcohol are reacted to form a homogeneous solution, a carboxylic acid anhydride is then brought into contact with the homogeneous solution, this solution is then brought into contact reaction with a titanium halide and an internal electron donating compound to obtain a solid, and the titanium halide is brought into contact with the solid to prepare an olefin polymerization solid catalyst component.

(3) Metallic magnesium, butyl chloride and a dialkyl ether are reacted to synthesize an organomagnesium compound, an alkoxytitanium is brought into contact reaction with the organomagnesium compound to obtain a solid product, and an internal electron donating compound and a titanium halide are brought into contact reaction with the solid product to prepare an olefin polymerization solid catalyst component. Here, the olefin polymerization solid catalyst component may be subjected to preliminary polymerization treatment with an organoaluminum compound, an organosilicon compound and an olefin to prepare an olefin polymerization solid catalyst component.

(4) An organomagnesium compound such as a dialkylmagnesium and an organoaluminum compound are brought into contact reaction with an alcohol in the presence of a hydrocarbon solvent to form a homogeneous solution, a silicon compound such as silicon tetrachloride is brought into contact with the solution to obtain a solid product, a titanium halide and an internal electron donating compound are then brought into contact reaction with the solid product in the presence of an aromatic hydrocarbon solvent, and titanium tetrachloride is then brought into contact with the reaction product to prepare an olefin polymerization solid catalyst component.

(5) Magnesium chloride, a tetraalkoxytitanium and an aliphatic alcohol are brought into contact reaction with one another in the presence of a hydrocarbon solvent to form a homogeneous solution, the solution and a titanium halide are brought into contact with each other, and then heated to precipitate a solid, and the solid is brought into contact with an internal electron donating compound, and reacted with the titanium halide to prepare an olefin polymerization solid catalyst component.

(6) Metallic magnesium powder, an alkyl monohalogen compound and iodine are brought into contact reaction with one another, a tetraalkoxytitanium, an acid halide and an aliphatic alcohol are then brought into contact reaction with one another in the presence of a hydrocarbon solvent to form a homogeneous solution, titanium tetrachloride is added to the solution, the mixture is then heated to precipitate a solid product, and the solid product is brought into contact with an internal electron donating compound, and reacted with titanium tetrachloride to prepare an olefin polymerization solid catalyst component.

(7) A dialkoxymagnesium is suspended in a hydrocarbon solvent, the resulting suspension is then brought into contact with titanium tetrachloride, then heated, and brought into contact with an internal electron donating compound to obtain a solid product, and the solid product is washed with a hydrocarbon solvent, and then brought into contact with titanium tetrachloride again in the presence of a hydrocarbon solvent to prepare an olefin polymerization solid catalyst component. Here, the olefin polymerization solid catalyst component may be heated in the presence or non-presence of a hydrocarbon solvent.

(8) A dialkoxymagnesium is suspended in a hydrocarbon solvent, the resulting suspension is then brought into contact reaction with a titanium halide and an internal electron donating compound to obtain a solid product, and the solid product is washed with an inert organic solvent, and then brought into contact reaction with the titanium halide again in the presence of a hydrocarbon solvent to obtain an olefin polymerization solid catalyst component (A). Here, the solid product and the titanium halide may be brought into contact with each other two or more times.

(9) A dialkoxymagnesium, calcium chloride and an alkoxy group-containing silicon compound are co-pulverized, the resulting pulverized solid is suspended in a hydrocarbon solvent, the resulting suspension is then brought into contact reaction with a titanium halide and an internal electron donating compound, and the titanium halide is then brought into contact with the reaction product to prepare an olefin polymerization solid catalyst component.

(10) A dialkoxymagnesium and an internal electron donating compound are suspended in a hydrocarbon solvent, the resulting suspension is brought into contact and reaction with a titanium halide to obtain a solid product, and the solid product is washed with a hydrocarbon solvent, and then brought into contact with the titanium halide in the presence of a hydrocarbon solvent to prepare an olefin polymerization solid catalyst component.

(11) Aliphatic magnesium such as magnesium stearate is brought into contact reaction with a titanium halide and an internal electron donating compound, and then brought into contact with the titanium halide to prepare an olefin polymerization solid catalyst component.

(12) A dialkoxymagnesium is suspended in a hydrocarbon solvent, the resulting suspension is brought into contact with a titanium halide, then heated, and brought into contact reaction with an internal electron donating compound to obtain a solid product, and the solid product is washed with a hydrocarbon solvent, and then brought into contact with the titanium halide again in the presence of a hydrocarbon solvent to prepare an olefin polymerization solid catalyst component, where any of the steps of suspension, contact and contact reaction involves contact with aluminum chloride.

(13) A dialkoxymagnesium, a 2-ethylhexyl alcohol and carbon dioxide are brought into contact reaction with one another in the presence of a hydrocarbon solvent to form a homogeneous solution, a titanium halide and an internal electron donating compound are brought into contact reaction with the solution to obtain a solid, the solid is dissolved in tetrahydrofuran, a solid product is then precipitated, the solid product is brought into contact reaction with the titanium halide, and the contact reaction is repeated if necessary to prepare an olefin polymerization solid catalyst component. Here, a silicon compound such as tetrabutoxysilane may be used in any of the steps of suspension, contact reaction and dissolution.

(14) Magnesium chloride, an organic epoxy compound and a phosphoric acid compound are suspended in a hydrocarbon solvent, the resulting suspension is then heated to form a homogeneous solution, a carboxylic acid anhydride and a titanium halide are brought into contact reaction with the solution to obtain a solid product, an internal electron donating compound is brought into contact and reaction with the solid product, and the resulting reaction product is washed with a hydrocarbon solvent, and then brought into contact with the titanium halide again in the presence of a hydrocarbon solvent to prepare an olefin polymerization solid catalyst component.

(15) A dialkoxymagnesium, a titanium compound and an internal electron donating compound are brought into contact reaction with one another in the presence of a hydrocarbon solvent, and the resulting product is brought into contact reaction with a silicon compound such as polysiloxane, brought into contact reaction with a titanium halide, then brought into contact reaction with an organic acid metal salt, and then brought into contact with the titanium halide again to prepare an olefin polymerization solid catalyst component.

(16) A dialkoxymagnesium and an internal electron donating compound are suspended in a hydrocarbon solvent, the resulting suspension is then heated, brought into contact with a silicon halide, and then brought into contact with a titanium halide to obtain a solid product, and the solid product is washed with a hydrocarbon solvent, and then brought into contact with the titanium halide again in the presence of a hydrocarbon solvent to prepare an olefin polymerization solid catalyst component. Here, the solid product may be heated in the presence or non-presence of a hydrocarbon solvent.

In the preparation methods (1) to (16), for further improving polymerization activity during polymerization of the olefin and the stereoregularity of the generated polymer, a process may be repeated 1 to 10 times in which the resulting olefin polymerization solid catalyst component is washed, and then further brought into contact with a titanium halide and a hydrocarbon solvent at 20 to 100° C., and heated to perform reaction treatment (secondary reaction treatment), and the resulting reaction product is then washed with an inert organic solvent which is liquid at normal temperature.

The contact temperature between the components may be in a relatively low-temperature range around room temperature when the components are simply brought into contact with one another and mixed with stirring or when the components are dispersed or suspended to perform modification treatment. When the components are brought into contact with one another, and then reacted to obtain a product, the contact temperature is preferably 40 to 130° C. because it is easy to control the reaction rate and the reaction. The stirring time is preferably 1 minute or more, more preferably 10 minutes or more, still more preferably 30 minutes or more.

Preferably, the resulting olefin polymerization solid catalyst component is formed into a powdered solid component by removing the remaining solvent until the mass ratio of the solvent to the olefin polymerization solid catalyst component is $1/3$ or less, preferably $1/20$ to $1/6$, and fine powder having a particle diameter of 11 μm or less and existing in the powder solid component is removed by means such as airflow classification.

The ratio of the amounts of the components used in preparation of the olefin polymerization solid catalyst component varies depending on the preparation method, and therefore cannot be broadly specified. For example, the amount of the tetravalent titanium halogen compound is preferably 0.5 to 100 mol, more preferably 0.5 to 50 mol, still more preferably 1 to 10 mol, the amount of the internal electron donating compound is preferably 0.01 to 10 mol, more preferably 0.01 to 1 mol, still more preferably 0.02 to 0.6 mol, the amount of the solvent is preferably 0.001 to 500 mol, more preferably 0.001 to 100 mol, still more preferably 0.005 to 10 mol, and the amount of the polysiloxane is preferably 0.01 to 100 g, more preferably 0.05 to 80 g, still more preferably 1 to 50 g, per 1 mol of the magnesium compound.

Any of the methods for preparing an olefin polymerization solid catalyst component (1) to (16) can be suitably used. Of these, the preparation method (1), (3), (4), (5), (7), (8) or (10) is preferable, the preparation method (3), (4), (7), (8) or (10) is more preferable, and the preparation method (10) is still more preferable.

Examples of more specific aspects of the preparation method (10) include a method in which a dialkoxymagnesium and an internal electron donating compound are suspended in one or more hydrocarbon solvents selected from linear hydrocarbons, branched aliphatic hydrocarbons, cycloaliphatic hydrocarbons and aromatic hydrocarbons, the resulting suspension is brought into contact and reaction with a titanium halide to obtain a solid product, and the solid product is washed with a hydrocarbon solvent, and then brought into contact with the titanium halide in the presence of a hydrocarbon solvent to obtain an olefin polymerization solid catalyst component.

When an olefin polymerization solid catalyst component is prepared by any of the above-described preparation methods, it is possible to provide an olefin polymerization solid catalyst component with which polypropylene or a propylene-based polymer such as a propylene-based block copolymer which has high stereoregularity can be easily produced as an olefin polymer.

In the present invention, the olefin polymerization catalyst includes a contact reaction product of the olefin polymerization solid catalyst component, a first external electron donating compound as described later, and at least one organoaluminum compound selected from the compounds of the following general formula (I):

$$R^1_p AlQ_{3-p} \quad (I)$$

(wherein $R^1$ is an alkyl group having 1 to 6 carbon atoms, Q is a hydrogen atom or a halogen atom, p is a real number of more than 0 and not more than 3, $R^1$s may be the same or different when two or more $R^1$s exist, and Qs may be the same or different when two or more Qs exist).

In the organoaluminum compound represented by the general formula (I), $R^1$ is an alkyl group having 1 to 6 carbon atoms, and specific examples thereof include a methyl group, an ethyl group, a n-propyl group, an isopropyl group, a n-butyl group and an isobutyl group, with an ethyl group or isobutyl group being preferable.

In the organoaluminum compound represented by the general formula (I), Q represents a hydrogen atom or a halogen atom, and examples of the halogen atom represented by Q include a fluorine atom, a chlorine atom, a bromine atom and an iodine atom. Q is preferably a hydrogen atom, a chlorine atom or a bromine atom.

In the organoaluminum compound represented by the general formula (I), p is a real number of more than 0 and not more than 3, and is preferably 2 or 3, more preferably 3.

In the organoaluminum compound represented by the general formula (I), $R^1$s may be the same or different when two or more $R^1$s exist, and Qs may be the same or different when two or more Qs exist.

The specific example of the organoaluminum compound is one or more selected from trialkylaluminums such as triethylaluminum, tri-iso-propylaluminum, tri-n-butylaluminum, tri-n-hexylaluminum and tri-iso-butylaluminum and alkylaluminum halides such as diethylaluminum chloride and diethylaluminum bromide, and the like, preferably one or more selected from alkylaluminum halides such as diethylaluminum chloride, or trialkylaluminums such as triethylaluminum, tri-n-butylaluminum and tri-iso-butylaluminum, more preferably one or more selected from triethylaluminum and tri-iso-butylaluminum.

The olefin polymerization catalyst for use in the method of the present invention includes a contact reaction product of the olefin polymerization solid catalyst component, the organoaluminum compound represented by the general formula (I), and the first external electron donating compound.

Examples of the first external electron donating compound include phenyltrialkoxysilanes, alkyltrialkoxysilanes, cycloalkyltrialkoxysilanes, (alkylamino) trialkoxysilanes, (dialkylamino)trialkoxysilanes, di(alkylamino)dialkylsilanes and di(dialkylamino)dialkylsilanes.

The first external electron donating compound is preferably one or more selected from organosilicon compounds having a Si—C bond and aminosilane compounds having a Si—N—C bond, each of which is represented by the following general formula (II):

$$R^2 Si(OR^3)_3 \quad (II)$$

(wherein $R^2$ is an alkyl group having 1 to 12 carbon atoms, a vinyl group, an allyl group, an aralkyl group, a cycloalkyl group having 3 to 12 carbon atoms, a phenyl group, an alkylamino group having 1 to 12 carbon atoms, or a dialkylamino group having 1 to 12 carbon atoms, $R^3$ is an alkyl group having 1 to 4 carbon atoms, a cycloalkyl group having 3 to 6 carbon atoms, a phenyl group, a vinyl group, an allyl group or an aralkyl group, and $R^3$s may be the same or different), or one or more selected from aminosilane compounds having a Si—N—C bond and represented by the following general formula (III):

$$R^4_2 Si(NR^5 R^6)(NR^7 R^8) \quad (III)$$

(wherein $R^4$ is an alkyl group having 1 to 12 carbon atoms, a vinyl group, an allyl group, an aralkyl group, a cycloalkyl group having 3 to 12 carbon atoms, or a phenyl group, $R^4$s may be the same or different, and $R^5$, $R^6$, $R^7$ and $R^8$ are each independently hydrogen, an alkyl group having 1 to 4 carbon atoms, a cycloalkyl group having 3 to 6 carbon atoms, a phenyl group, a vinyl group, an allyl group or an aralkyl group, and may be the same or mutually different)

Specifically, the first external electron donating compound, which is the organosilicon compound having a Si—C bond and represented by the general formula (II), is preferably phenyltrimethoxysilane, t-butyltrimethoxysilane or the like.

Specifically, the first external electron donating compound, which is the aminosilane compound having a Si—N—C bond and represented by the general formula (II), is preferably diethylaminotriethoxysilane or the like.

Specifically, the first external electron donating compound, which is the compound represented by the general formula (III), is preferably one or more selected from di(cyclopentyl)di(ethylamino)silane, cyclohexylmethyldi(ethylamino)silane and the like.

In the present invention, the olefin polymerization catalyst includes a contact reaction product of the olefin polymerization solid catalyst component containing a titanium atom, a magnesium atom, a halogen atom and an internal electron donating compound, at least one organoaluminum compound represented by the general formula (I), and the first external electron donating compound.

The olefin polymerization catalyst may be once prepared in a reactor, then taken out from the reactor, and then used for polymerization of propylene, or the catalyst may be once prepared, and then directly used in the same rector without being taken out from the reactor.

When the olefin polymerization solid catalyst component, at least one organoaluminum compound represented by the general formula (I), and the first external electron donating compound are brought into contact with one another, the ratio of the contact amounts of the components is arbitrary, and is not particularly limited as long as the effects of the present invention are not affected.

Typically, the amount of the organoaluminum compound represented by the general formula (I) is preferably 1 to 2000 mol, more preferably 50 to 1000 mol, per 1 mol of titanium atoms that form the olefin polymerization solid catalyst component. The amount of the first external electron donating compound is preferably 0.002 to 10 mol, more preferably 0.01 to 2 mol, still more preferably 0.01 to 0.5 mol, per 1 mole of the organoaluminum compound represented by the general formula (I).

While the contact order of the components is arbitrary, it is desirable that the organoaluminum compound represented by the general formula (I) be first introduced into a reaction system, then brought into contact with the first external electron donating compound, and then brought into contact with the olefin polymerization solid catalyst component.

The contact temperature at which the olefin polymerization solid catalyst component, the organoaluminum compound represented by the general formula (I) and the first external electron donating compound are brought into contact with one another is not particularly limited, and is preferably lower than the boiling point of the organoaluminum compound. Specifically, the contact temperature is preferably equal to or lower than room temperature, more preferably 0 to 20° C.

The contact and reaction time during which the olefin polymerization solid catalyst component, the organoaluminum compound represented by the general formula (I) and the first external electron donating compound are brought into contact with one another is not particularly limited, and is preferably 0.1 to 120 minutes, more preferably 0.5 to 60 minutes, still more preferably 1 to 30 minutes.

The olefin polymer according to the present invention comprises a propylene initial polymerization product formed in the presence of an olefin polymerization catalyst including a contact reaction product of the olefin polymerization solid catalyst component containing a titanium atom, a magnesium atom, a halogen atom and an internal electron donating compound, at least one organoaluminum compound represented by the general formula (I), and the first external electron donating compound; and a polypropylene part formed of propylene polymerization product formed in the presence of the olefin polymerization catalyst and a second external electron donating compound higher in adsorption to the surface of the olefin polymerization solid catalyst component than the first external electron donating compound.

That is, the olefin polymer according to the present invention is one obtained by forming a propylene initial polymerization product in the presence of an olefin polymerization catalyst including a contact reaction product of the olefin polymerization solid catalyst component containing a titanium atom, a magnesium atom, a halogen atom and an internal electron donating compound, at least one organoaluminum compound represented by the general formula (I), and the first external electron donating compound; and forming a polypropylene part by further polymerizing the propylene with a second external electron donating compound added to the reaction system, the second external electron donating compound being higher in adsorption to the surface of the solid catalyst component than the first external electron donating compound.

The propylene initial polymerization product formed in the presence of the olefin polymerization catalyst means a polymerization product formed by reaction of at least a part of the propylene monomer added to the reaction system, and generated in the step of polymerizing propylene (main polymerization step) before addition of the second external electron donating compound to the reaction system, and may contain an unreacted propylene monomer.

Details of the method for obtaining a propylene initial polymerization product are as described later.

The olefin polymer according to the present invention comprises a propylene initial polymerization product; and a polypropylene part formed of a propylene polymerization product formed in the presence of (i) the olefin polymerization catalyst and (ii) the second external electron donating compound higher in adsorption to the surface of the olefin polymerization solid catalyst component than the first external electron donating compound.

Details of the olefin polymerization catalyst are as described above.

In the present application, the degree of the adsorption of the external electron donating compound to the surface of the solid catalyst component is determined by the following method.

(1) As amounts of hydrogen necessary for ensuring that a polymer obtained by polymerizing propylene under the same conditions (the same alkylaluminum concentration, introduction of catalysts at the same Al/Ti ratio, the same Si/Ti ratio, the same polymerization temperature and the like) in a polymerization system attains a melt flow rate (MFR) of 30 g/10 min as measured in accordance with JIS K 7210, the amount of hydrogen (H1) in propylene polymerization performed using two external electron denoting compounds mixed in equimolar amounts, and the amounts of hydrogen (H2 and H3) in propylene polymerization performed using one of the two external electron denoting compounds, are measured respectively.

(2) It is determined that the external electron donating compound corresponding to H2 is preferentially adsorbed to the surface of the solid catalyst component over the external electron donating compound corresponding to H3 when the H1 shows a value closer to H2 than to H3, and it is determined that the external electron donating compound corresponding to H3 is preferentially adsorbed to the surface of the solid catalyst component over the external electron donating compound corresponding to H2 when the H1 shows a value closer to H3 than to H2.

Thus, the H1 is compared with H2 and H3, and it is determined that the external electron donating compound corresponding to H2 is higher in adsorption to the surface of the solid catalyst component than the external electron donating compound corresponding to H3 when the H1 shows a value closer to H2 than to H3, and the external electron donating compound corresponding to H3 is higher in adsorption to the surface of the solid catalyst component than the external electron donating compound corresponding to H2 when the H1 shows a value closer to H3 than to H2.

Examples of the second external electron donating compound include one or more selected from silane compounds represented by the following general formula (IV):)

$$R^9{}_2Si(OR^{10})_2 \tag{IV}$$

(wherein $R^9$ is an alkyl group having 1 to 12 carbon atoms, a vinyl group, an allyl group, an aralkyl group, a cycloalkyl group having 3 to 12 carbon atoms, or a phenyl group, $R^{10}$ is an alkyl group having 1 to 4 carbon atoms, a cycloalkyl group having 3 to 6 carbon atoms, a phenyl group, a vinyl group, an allyl group or an aralkyl group, $R^9$s may be the same or different, and $R^{10}$s may be the same or different).

Examples of the second external electron donating compound include one or more selected from diphenyldialkoxysilanes, dialkyldialkoxysilanes, phenylalkyldialkoxysilanes, di(cycloalkyl)dialkoxysilanes and (cycloalkyl) alkyldialkoxysilanes.

Specific examples thereof include one or more selected from diphenyldimethoxysilane, di-t-butyldimethoxysilane, di-iso-propyldimethoxysilane, di-iso-pentyldimethoxysilane, bis(2-ethylhexyl)dimethoxysilane, di-t-butyldimethoxysilane, dicyclopentyldimethoxysilane, dicyclohexyldimethoxysilane, dicyclohexylmethyldimethoxysilane and the like. Of these, one or more selected from diphenyldimethoxysilane, di-t-butyldimethoxysilane, di-iso-propyldimethoxysilane, di-iso-pentyldimethoxysilane, dicyclopentyldimethoxysilane and the like can be preferably used.

In the present invention, during polymerization of propylene, the second external electron donating compound higher in adsorption to the surface of the solid catalyst component than the first external electron donating compound that forms the polymerization catalyst is added together with the polymerization catalyst to the reaction system, and consequently, a polymer is generated from an active site formed of the second external electron donating compound subsequently to generation of a propylene initial polymerization product from an active site formed of the first external electron donating compound. Thus, it is possible to provide a novel olefin polymer which is excellent in lightness and moldability, has high rigidity, and yields molded products excellent in flexural elasticity and which includes a polypropylene part.

The olefin polymer according to the present invention is not particularly limited as long as it is a propylene-based polymer including a polypropylene part.

For example, the olefin polymer may be polypropylene (homopolypropylene), or a propylene-based block copolymer obtained by copolymerizing the polypropylene part with an α-olefin other than propylene.

The α-olefin other than propylene, which is copolymerized with the polypropylene part, is at least one olefin selected from α-olefins having 2 to 20 carbon atoms (except for propylene that has 3 carbon atoms), and examples thereof include one or more selected from ethylene, 1-butene, 1-pentene, 4-methyl-1-pentene, vinylcyclohexane and the like. Ethylene or 1-butene is preferable, with ethylene being more preferable.

The olefin polymer according to the present invention can be produced by forming a propylene initial polymerization product in the presence of an olefin polymerization catalyst which is a contact reaction product of the olefin polymerization solid catalyst component containing a titanium atom, a magnesium atom, a halogen atom and an internal electron donating compound, at least one organoaluminum compound represented by the general formula (I), and the first external electron donating compound; and forming a polypropylene part by further polymerizing the propylene with a second external electron donating compound added to the reaction system, the second external electron donating compound being higher in adsorption to the surface of the solid catalyst component than the first external electron donating compound.

In the present invention, when the polypropylene part is formed by polymerizing propylene (main polymerization) using the olefin polymerization catalyst, it is desirable to perform preliminary polymerization prior to the main polymerization for further improving the catalysis activity, the stereoregularity, the properties of polymer particles generated, and the like.

When preparation of the olefin polymerization catalyst and preliminary polymerization of propylene are performed in the same reactor, a method is desirable in which the organoaluminum compound represented by the general formula (I) is first introduced into a preliminary polymerization system set to an inert gas atmosphere or a propylene gas atmosphere, and is then brought into contact with the first external electron donating compound, brought into contact with the olefin polymerization solid catalyst component, and then brought into contact with propylene.

The polymerization temperature during preliminary polymerization is preferably −20 to 80° C., more preferably −10 to 60° C., still more preferably 0 to 40° C.

The polymerization time during preliminary polymerization is preferably 0.1 to 60 minutes, more preferably 0.5 to 40 minutes, still more preferably 1 to 20 minutes.

The polymerization pressure during preliminary polymerization is preferably 0.1 to 4 MPa, more preferably 0.3 to 3 MPa, still more preferably 0.5 to 2 MPa.

In the present invention, examples of the method for performing main polymerization including initial polymerization include a slurry polymerization method using a solvent of an inert hydrocarbon compound such as cyclohexane or heptane, a bulk polymerization method using a solvent such as liquefied propylene, and a vapor phase polymerization method which does not substantially involve a solvent. A bulk polymerization method or a vapor phase polymerization method is preferable.

Examples of the polymerization reactor for performing main polymerization of an olefin using an olefin polymerization catalyst in the present invention include reactors such as stirrer-equipped autoclaves and flow baths. In the reactor, a particulate or powdered polymer can be placed in a stationary phase, and moved using a stirring device or a fluidized bed.

The molecular weight of a polypropylene part to be obtained may be extensively adjusted and set by adding a modifier that is commonly used in polymerization techniques, such as hydrogen.

For removing heat of polymerization, a liquid easily volatile hydrocarbon, for example butane, may be supplied, and volatilized in a polymerization zone.

The olefin polymer according to the present invention includes a polypropylene part formed by polymerizing a propylene initial polymerization product formed in the presence of the olefin polymerization catalyst with propylene in the presence of the olefin polymerization catalyst and the second external electron donating compound higher in adsorption to the surface of the olefin polymerization solid catalyst component than the first external electron donating compound.

As described above, the propylene initial polymerization product means a polymerization product generated in the step of main polymerization of propylene before addition of the second external electron donating compound.

The olefin polymer according to the present invention may be one formed by once producing a propylene initial polymerization product, taking out the propylene initial polymerization product, and then polymerizing propylene in the presence of the olefin polymerization catalyst and the second external electron donating compound to form a polypropylene part, and the olefin polymer is preferably one formed by polymerizing propylene in the presence of the olefin polymerization catalyst in a reactor to prepare a propylene initial polymerization product, and then adding the second external electron donating compound in the reactor to continuously perform polymerization treatment.

Polymerization of propylene (in main polymerization) can be performed in the presence or non-presence of an organic solvent, and the propylene can be used in any of gas and liquid states.

The polymerization temperature (main polymerization temperature) is preferably 200° C. or lower, more preferably 100° C. or lower, still more preferably 50 to 90° C.

The polymerization pressure (main polymerization pressure) is preferably normal pressure to 10 MPa, more preferably normal pressure to 5 MPa, still more preferably 1 to 4 MPa.

The polymerization time (main polymerization time) is preferably 0.25 to 4 hours, more preferably 0.25 to 3 hours, still more preferably 0.5 to 2 hours.

The polymerization reaction may be performed in one step, or in two or more steps.

In the present invention, the second external electron donating compound higher in adsorption to the surface of the olefin polymerization solid catalyst component than the first external electron donating compound is added to the reaction system in the process of polymerization (main polymerization) of propylene.

The amount of the second external electron donating compound added is preferably 0.1 to 10 mol, more preferably 0.2 to 5 mol, still more preferably 0.5 to 3 mol, per 1 mol of the first external electron donating compound added.

In the present invention, when the second external electron donating compound added is within the above-described range, a polymer is generated from an active site formed of the second external electron donating compound subsequently to generation of a propylene initial polymerization product from an active site formed of the first external electron donating compound. Thus, it is possible to easily provide a novel olefin polymer which is excellent in lightness and moldability, has high rigidity, and yields molded products excellent in flexural elasticity and which includes a polypropylene part.

In the present invention, it is suitable to add the second external electron donating compound to the reaction system in such a manner that the ratio of the time for addition of the second external electron donating compound to the total polymerization time (in main polymerization) is preferably 5 to 95%, more preferably 10 to 90%, still more preferably 20 to 80%.

When the ratio of the time for addition of the second external electron donating compound to the total polymerization time is within the above-described range, a necessary amount of the polymer generated from the active site formed of the second external electron donating compound can be easily introduced into the propylene initial polymerization product generated from the active site formed of the first external electron donating compound.

In this way, the polypropylene part that forms the olefin polymer of the present invention can be formed. When polypropylene (homopolypropylene) is to be obtained as the olefin polymer of the present invention, the polypropylene part itself can be taken as polypropylene (homopolypropylene).

When a propylene-based block copolymer is to be obtained as the olefin polymer of the present invention, the propylene-based block copolymer can be prepared by forming a polypropylene part by the above-described method, and then performing copolymerization of propylene and an alpha-olefin, particularly ethylene, or terpolymerization of propylene, ethylene and 1-butene in the subsequent step.

The olefin monomer such as an alpha-olefin, which is reacted at the time of copolymerization reaction can be used in any of gas and liquid states, and the copolymerization reaction can be carried out in the presence or non-presence of an organic solvent.

Specifically, in the prior step, a polypropylene part is formed by polymerizing a monomer in an amount equivalent to 20 to 90 mass % based on the total of a propylene-based block copolymer to be obtained while adjusting the polymerization temperature and the polymerization time, and then, in the subsequent step, propylene and ethylene or another α-olefin are introduced, and subjected to copolymerization reaction to form a rubber part such as ethylene-propylene rubber (EPR) or an ethylene-propylene-1-butene terpolymer while reaction conditions are adjusted so that the ratio of the rubber part is 10 to 80 mass % based on the total of the propylene-based block copolymer to be obtained.

In general, the reaction for the copolymerization treatment in the subsequent step is preferably vapor phase polymerization reaction for suppressing elution of the rubber part such as EPR from polypropylene particles.

The formation of the polypropylene part in the prior step and the copolymerization reaction treatment in the subsequent step may be performed by any of a continuous polymerization method and a batch-type polymerization method.

Further, the polymerization reaction in each of the treatments in the prior step and the subsequent step may be one-stage or multistage reaction, and when each step is carried out in multiple stages, the same condition or different conditions can be applied to the stages.

The polymerization temperature during copolymerization reaction is preferably 200° C. or lower, more preferably 100° C. or lower.

The polymerization pressure during polymerization reaction is preferably 10 MPa or less, more preferably 5 MPa or less.

Further, the suitable polymerization time (retention time of reaction raw materials) during copolymerization reaction is 1 minute to 5 hours in terms of the total polymerization time.

In this way, polypropylene (homopolypropylene) or a propylene-based polymer such as a propylene-based block copolymer can be obtained as the olefin polymer according to the present invention.

When the olefin polymer according to the present invention is polypropylene, the melt flow rate (MFR) is preferably 10 g/10 min to 100 g/10 min, more preferably 10 g/10 min to 60 g/10 min, still more preferably 20 g/10 min to 50 g/10 min.

When the olefin polymer according to the present invention is a propylene-based block copolymer, the melt flow rate (MFR) is preferably 1 g/10 min to 100 g/10 min, preferably 5 g/10 min to 80 g/10 min, more preferably 10 g/10 min to 50 g/10 min.

When the olefin polymer according to the present invention is polypropylene, the ratio of the xylene-soluble component (XS) is preferably 3.0 mass % or less, more preferably 2.0 mass % or less, still more preferably 1.5 mass % or less.

When the olefin polymer according to the present invention is a propylene-based block copolymer, the ratio of the xylene-soluble component (XS) is preferably 50 mass % or less, more preferably 40 mass % or less, still more preferably 30 mass % or less.

When the olefin polymer according to the present invention is polypropylene, the molecular weight distribution Mw/Mn is preferably 5.5 or more, more preferably 5.5 to 15, still more preferably 5.5 to 10.

When the olefin polymer according to the present invention is a propylene-based block copolymer, the molecular weight distribution Mw/Mn is preferably 5.5 or more, more preferably 5.5 to 15, still more preferably 5.5 to 10.

When the olefin polymer according to the present invention is polypropylene, the ratio of complex viscosity $\eta^*$ at an angular frequency of 300 radians/sec to complex viscosity η* at an angular frequency of 0.03 radians/sec (complex viscosity η* at angular frequency of 300 radians/sec/complex viscosity η* at angular frequency of 0.03 radians/sec) is preferably 8.5 or more, more preferably 8.5 to 15, still more preferably 8.5 to 12.

When the olefin polymer according to the present invention is a propylene-based block copolymer, the ratio of complex viscosity η* at an angular frequency of 300 radians/sec to complex viscosity η* at an angular frequency of 0.03 radians/sec (complex viscosity η* at angular frequency of 300 radians/sec/complex viscosity η* at angular frequency of 0.03 radians/sec) is preferably 10 or more, more preferably 10 to 40, still more preferably 10 to 30.

When the olefin polymer according to the present invention is polypropylene (homopolypropylene), the flexural modulus FM is preferably 1650 MPa or more, more preferably 1650 to 2500 MPa, still more preferably 1700 to 2300 MPa.

When the olefin polymer according to the present invention is a propylene-based block copolymer, the flexural modulus FM is preferably 1100 MPa or more, more preferably 1100 to 2300 MPa, still more preferably 1100 to 2000 MPa.

In the present application, the melt flow rate (MFR) of the olefin polymer, the ratio of the xylene-soluble component (XS), the molecular weight distribution Mw/Mn, the complex viscosity ratio and the flexural modulus FM are values measured, respectively, by methods as described later.

According to the present invention, it is possible to provide a novel olefin polymer which is excellent in lightness and moldability, has high rigidity, and yields molded products excellent in flexural elasticity.

A method for producing an olefin polymer according to the present invention will now be described.

The method for producing an olefin polymer according to the present invention comprises: forming a propylene initial polymerization product in the presence of an olefin polymerization catalyst which is a contact reaction product of:

an olefin polymerization solid catalyst component containing a titanium atom, a magnesium atom, a halogen atom and an internal electron donating compound, at least one organoaluminum compound selected from the compounds of the general formula (I):

$$R^1_p AlQ_{3-p} \quad (I)$$

(wherein $R^1$ is an alkyl group having 1 to 6 carbon atoms, Q is a hydrogen atom or a halogen atom, p is a real number of more than 0 and not more than 3, $R^1$s may be the same or different when two or more $R^1$s exist, and Qs may be the same or different when two or more Qs exist), and a first external electron donating compound; and further in forming a polypropylene part by further polymerizing propylene, adding a second external electron donating compound to the reaction system, the second external electron donating compound being higher in adsorption to the surface of the olefin polymerization solid catalyst component than the first external electron donating compound.

Details of the method for producing an olefin polymer according to the present invention are as described in detail for the olefin polymer according to the present invention.

According to the present invention, it is possible to provide a method for easily producing a novel olefin polymer which is excellent in lightness and moldability, has high rigidity, and yields molded products excellent in flexural elasticity.

EXAMPLES

The present invention will now be described in more detail by way of Examples, which are illustrative only, and should not be construed as limiting the present invention.

Example 1

(Synthesis of Solid Catalyst Component)

10 g (87.4 mmol) of diethoxymagnesium, 55 ml of toluene, 30 ml of titanium tetrachloride and 15.3 mmol (3.8 g) of dibutyl phthalate were put in a flask equipped with a stirring device, sufficiently exchanged with nitrogen gas and having an internal volume of 500 ml, the mixture was heated to 100° C., and reacted for 90 minutes in a state of being held at a temperature of 100° C., and the resulting reaction product was then washed four times with 75 ml of toluene at 100° C.

Next, 100 ml of a toluene solution containing titanium tetrachloride in a ratio of 10 vol %, the mixture was heated to 100° C., and stirred for 15 minutes to be reacted, and the resulting product was then washed once with toluene at 100° C. This process was further carried out twice, and the product was then washed six times with 75 ml of n-heptane at 40° C. to obtain a solid catalyst component.

The resulting solid catalyst component was subjected to solid-liquid separation, and the titanium content percentage in the solid content was measured. The result showed that the titanium content percentage was 1.8 mass %.

(Formation and Polymerization of Polymerization Catalyst)

A stirrer-equipped autoclave completely exchanged with nitrogen gas and having an internal volume of 2.0 l was charged with 1.32 mmol of triethylaluminum, 0.13 mmol of diethylaminotriethoxysilane (DEATES) and 0.0026 mmol, in terms of titanium atoms, of the solid catalyst component to form a polymerization catalyst.

Subsequently, the autoclave was further charged with 1.5 l of hydrogen gas and 1.4 l of liquefied propylene, preliminary polymerization was performed at 20° C. for 5 minutes, and the resulting polymerization product was then heated to 70° C. in 7 minutes or less. 15 minutes after the start of the heating, 0.2 mmol of dicyclopentyldimethoxysilane (DCPDMS) was added, and the mixture was then subjected to polymerization reaction for 45 minutes to obtain a polymer (polypropylene).

The polymerization activity per 1 g of the solid catalyst component, and the ratio of a p-xylene-soluble component (XS), the melt flow rate (MFR), the molecular weight distribution (Mw/Mn), the complex viscosity η* and the flexural modulus (FM) in the resulting polymer were evaluated by the following methods. Table 1 shows the results.

(Polymerization Activity Per 1 g of Solid Catalyst Component)

The polymerization activity per 1 g of the solid catalyst component (g-pp/g-catalyst) was determined from the following expression:

polymerization activity(g-pp/g-catalyst)=mass of resulting polymer (g)/mass of solid catalyst component (g)

(Measurement of Xylene-Soluble Component (XS) in Polymer)

A flask equipped with a stirring device was charged with 4.0 g of a polymer (polypropylene) and 200 ml of p-xylene, and the polymer was dissolved over 2 hours with the external temperature adjusted to a temperature equal to or higher than the boiling point of xylene (about 150° C.) to keep the p-xylene in the flask at a temperature equal to or lower than the boiling point (137 to 138° C.). The liquid temperature was then lowered to 23° C. over 1 hour, and an undissolved component and a dissolved component were separated by filtration. The dissolved component solution was taken, and dried by heating under reduced pressure to distill away p-xylene, the resulting residual material was defined as a xylene-soluble component (XS), and the mass of the component was determined as a relative value (mass %) against the mass of the polymer (polypropylene).

(Melt Flow Rate (MFR) of Polymer)

The melt flow rate (MFR) representing the melt flowability of the polymer was measured in accordance with ASTM D 1238, JIS K 7210.

(Molecular Weight Distribution of Polymer)

The molecular weight distribution of the polymer was evaluated by the ratio of a weight average molecular weight (Mw) to a number average molecular weight (Mn) (Mw/Mn), where the weight average molecular weight (Mw) and the number average molecular weight (Mn) were each measured with a gel permeation chromatograph (GPC) (HLC-8321 (GPC/HT) manufactured by TOSOH CORPORATION).

Solvent: o-dichlorobenzene (ODCB)
Temperature: 140° C.
Column: GMHHR-H(20)HT×1 and GMHHR-H(S) HT2×1
Sample concentration: 0.5 mg/mL (4 mg/8 mL—ODCB)
Injection amount: 0.5 mL
Flow rate: 1.0 mL/min Calculation of the molecular weight from the holding capacity obtained by GPC measurement was performed using a calibration curve prepared beforehand with standard polystyrene.

The following values were used in the viscosity formula: $[\eta]=K \times M^\alpha$ for calculation of the molecular weight of the polymer.

$$PS: K=1.38 \times 10^{-4}, \alpha=0.7$$

$$PP: K=1.03 \times 10^{-4}, \alpha=0.78$$

(Complex Viscosity $\eta^*$ of Polymer)

The complex viscosity $\eta^*$ of the polymer was measured using a rheometer (MCR302) manufactured by Anton Paar GmbH.

A disc-shaped measurement sample having a thickness of 2 mm and a diameter of 25 mm was prepared by compression-molding the polymer at 210° C. for 5 minutes while preventing ingress of bubbles.

Measurement was performed using a rheometer (MCR302 manufactured by Anton Paar GmbH).

Parallel discs having a diameter of 25 mm were arranged with a gap of 1 mm therebetween, and the gap was filled with the measurement sample. In this state, complex viscosity $\eta^*$ was measured at a measurement temperature of 210° C. and at frequencies ranging from 0.03 rad/sec to 300 rad/sec.

The complex viscosity ratio was calculated as a ratio of complex viscosity $\eta^*$ at an angular frequency of 300 radians/sec under the temperature condition of 210° C. to complex viscosity $\eta^*$ at an angular frequency of 0.03 radians/sec under the temperature condition of 210° C. (complex viscosity $\eta^*$ at an angular frequency of 300 radians/sec under the temperature condition of 210° C./complex viscosity $\eta^*$ at an angular frequency of 0.03 radians/sec under the temperature condition of 210° C.)

(Flexural Modulus (FM) of Polymer)

The flexural modulus FM (unit: MPa) of the polymer was measured at a measurement atmosphere temperature of 23° C. in accordance with JIS K7171 using an injection-molded test piece having a thickness of 4.0 mm, a width of 10.0 mm and a length of 80 mm.

The molding of the test piece was performed under the conditions of a molding temperature of 200° C. and a mold temperature of 40° C. from NEX30III3EG manufactured by NISSEI PLASTIC INDUSTRIAL CO., LTD.

Example 2

A polymerization catalyst was formed and polymerization was performed in the same manner as in Example 1 except that 30 minutes after the start of heating after preliminary polymerization, 0.2 mmol of dicyclopentyldimethoxysilane (DCPDMS) was added, followed by carrying out polymerization reaction for 30 minutes. Table 1 shows the results of polymerization.

Comparative Example 1

A polymerization catalyst was formed and polymerization was performed in the same manner as in Example 1 except that 0.13 mmol of diethylaminotriethoxysilane (DEATES) and 0.2 mmol of dicyclopentyldimethoxysilane (DCPDMS) were added at the same time during formation of the polymerization catalyst, and dicyclopentyldimethoxysilane (DCPDMS) was not added during polymerization of the liquefied propylene. Table 1 shows the results.

Example 3

A polymerization catalyst was formed and polymerization was performed in the same manner as in Example 1 except that instead of 0.13 mmol of diethylaminotriethoxysilane (DEATES), 0.13 mmol of normal propyltriethoxysilane (nPTES) was added during formation of the polymerization catalyst. Table 1 shows the results.

Example 4

A polymerization catalyst was formed and polymerization was performed in the same manner as in Example 3 except that 0.2 mmol of dicyclopentyldimethoxysilane (DCPDMS) was added 45 minutes after the start of heating after preliminary polymerization instead of adding 0.2 mmol of dicyclopentyldimethoxysilane (DCPDMS) 15 minutes after the start of heating after preliminary polymerization, and polymerization reaction was then carried out for 15 minutes instead of carrying out polymerization reaction for 45 minutes. Table 1 shows the results.

Comparative Example 2

A polymerization catalyst was formed and polymerization was performed in the same manner as in Comparative Example 1 except that instead of 0.13 mmol of diethylaminotriethoxysilane (DEATES), 0.13 mmol of normal propyltriethoxysilane (nPTES) was added during formation of the polymerization catalyst. Table 1 shows the results.

Comparative Example 3

A polymerization catalyst was formed and polymerization was performed in the same manner as in Example 1 except that dicyclopentyldimethoxysilane (DCPDMS) was not added during polymerization of liquefied propylene. Table 1 shows the results.

Comparative Example 4

A polymerization catalyst was formed and polymerization was performed in the same manner as in Comparative Example 3 except that instead of 0.13 mmol of diethylaminotriethoxysilane (DEATES), 0.13 mmol of dicyclopentyldimethoxysilane (DCPDMS) was added during formation of the polymerization catalyst. Table 1 shows the results.

Comparative Example 5

A polymerization catalyst was formed and polymerization was performed in the same manner as in Comparative Example 3 except that instead of 0.13 mmol of diethylaminotriethoxysilane (DEATES), 0.13 mmol of normal propyltriethoxysilane (nPTES) was added during formation of the polymerization catalyst. Table 1 shows the results.

Comparative Example 6

A polymerization catalyst was formed and polymerization was performed in the same manner as in Example 1 except that 0.13 mmol of dicyclopentyldimethoxysilane (DCPDMS) was added during formation of the polymerization catalyst, 0.2 mmol of diethylaminotriethoxysilane (DEATES) was added 15 minutes after the start of heating after preliminary polymerization, and polymerization reaction was then carried out for 45 minutes. Table 1 shows the results.

Comparative Example 7

A polymerization catalyst was formed and polymerization was performed in the same manner as in Example 1 except that 0.13 mmol of dicyclopentyldimethoxysilane (DCPDMS) was added during formation of the polymerization catalyst, 0.2 mmol of normal propyltriethoxysilane (nPTES) was added 15 minutes after the start of heating after preliminary polymerization, and polymerization reaction was then carried out for 45 minutes. Table 1 shows the results.

Example 5

A polymerization catalyst was formed and polymerization was performed in the same manner as in Example 1 except that 0.13 mmol of dicyclopentyldi(ethylamino)silane (DCPDEAS) was added instead of 0.13 mmol of diethylaminotriethoxysilane (DEATES) during formation of the polymerization catalyst, 0.2 mmol of dicyclopentyldimethoxysilane (DCPDMS) was added 30 minutes after the start of heating after preliminary polymerization, and polymerization reaction was then carried out for 30 minutes. Table 1 shows the results.

Example 6

A polymerization catalyst was formed and polymerization was performed in the same manner as in Example 1 except that 0.13 mmol of cyclohexylmethyldi(ethylamino)silane (CHMDEAS) was added instead of 0.13 mmol of diethylaminotriethoxysilane (DEATES) during formation of the polymerization catalyst, 0.2 mmol of dicyclopentyldimethoxysilane (DCPDMS) was added 30 minutes after the start of heating after preliminary polymerization, and polymerization reaction was then carried out for 30 minutes. Table 1 shows the results.

Comparative Example 8

A polymerization catalyst was formed and polymerization was performed in the same manner as in Comparative Example 3 except that 0.13 mmol of dicyclopentyldi(ethylamino)silane (DCPDEAS) was added instead of 0.13 mmol of diethylaminotriethoxysilane (DEATES) during formation of the polymerization catalyst. Table 1 shows the results.

Comparative Example 9

A polymerization catalyst was formed and polymerization was performed in the same manner as in Comparative Example 3 except that 0.13 mmol of cyclohexylmethyldi(ethylamino)silane (CHMDEAS) was added instead of 0.13 mmol of diethylaminotriethoxysilane (DEATES) during formation of the polymerization catalyst. Table 1 shows the results.

Comparative Example 10

A polymerization catalyst was formed and polymerization was performed in the same manner as in Comparative Example 1 except that 0.13 mmol of dicyclopentyldi(ethylamino)silane (DCPDEAS) was added instead of 0.13 mmol of diethylaminotriethoxysilane (DEATES) during formation of the polymerization catalyst. Table 1 shows the results.

Comparative Example 11

A polymerization catalyst was formed and polymerization was performed in the same manner as in Comparative Example 1 except that 0.13 mmol of cyclohexylmethyldi(ethylamino)silane (CHMDEAS) was added instead of 0.13 mmol of diethylaminotriethoxysilane (DEATES) during formation of the polymerization catalyst. Table 1 shows the results.

TABLE 1

| | First external electron donating compound | Second external electron donating compound | Amount of hydrogen (L) | Polymerization activity (g-PP/g-cat) | XS (mass %) | MFR (g/10 min) | Mw/Mn | Complex viscosity ratio | Flexural modulus FM (MPa) |
|---|---|---|---|---|---|---|---|---|---|
| Example 1 | DEATES | DCPDMS | 4.0 | 40,200 | 0.77 | 34 | 6.3 | 9.1 | 1,760 |
| Example 2 | DEATES | DCPDMS | 3.2 | 45,000 | 0.66 | 28 | 6.7 | 9.1 | 1,720 |
| Comparative Example 1 | DEATES, DCPDES | — | 9.0 | 63,500 | 0.58 | 37 | 5.9 | 8.0 | 1,750 |
| Example 3 | nPTES | DCPDMS | 4.7 | 49,900 | 0.88 | 39 | 3.5 | 9.6 | 1,780 |

TABLE 1-continued

| | First external electron donating compound | Second external electron donating compound | Amount of hydrogen (L) | Polymerization activity (g-PP/g-cat) | XS (mass %) | MFR (g/10 min) | Mw/Mn | Complex viscosity ratio | Flexural modulus FM (MPa) |
|---|---|---|---|---|---|---|---|---|---|
| Example 4 | nPTES | DCPDMS | 2.7 | 43,800 | 0.96 | 37 | 8.2 | 8.7 | 1,720 |
| Comparative Example 2 | nPTES, DCPDMS | — | 9.0 | 58,400 | 0.62 | 33 | 5.8 | 8.4 | 1,720 |
| Comparative Example 3 | DEATES | — | 2.6 | 46,100 | 0.84 | 36 | 4.8 | 6.7 | 1,630 |
| Comparative Example 4 | DCPDMS | — | 9.0 | 68,600 | 0.75 | 32 | 6.2 | 8.2 | 1,690 |
| Comparative Example 5 | nPTES | — | 1.9 | 38,900 | 1.26 | 31 | 4.8 | 7.5 | 1,620 |
| Comparative Example 6 | DCPDMS | DEATES | 9.0 | 66,000 | 0.67 | 34 | 6.1 | 8.1 | 1,720 |
| Comparative Example 7 | DCPDMS | nPTES | 9.0 | 63,500 | 0.68 | 32 | 6.0 | 8.3 | 1,700 |
| Example 5 | DCPDEAS | DCPDMS | 4.8 | 53,900 | 0.86 | 15 | 6.6 | 12.2 | 1,780 |
| Example 6 | CHMDEAS | DCPDMS | 5.1 | 47,300 | 0.82 | 20 | 6.5 | 11.2 | 1,760 |
| Comparative Example 8 | DCPDEAS | — | 1.5 | 30,000 | 2.84 | 36 | 6.1 | 9.3 | 1,570 |
| Comparative Example 9 | CHMDEAS | — | 1.2 | 28,800 | 2.66 | 32 | 5.1 | 8.0 | 1,610 |
| Comparative Example 10 | DCPDEAS, DCPDMS | — | 9.0 | 55,800 | 0.50 | 25 | 6.5 | 9.2 | 1,800 |
| Comparative Example 11 | CHMDEAS, DCEDMS | — | 9.0 | 53,400 | 0.87 | 38 | 6.4 | 7.9 | 1,770 |

Example 7

(1) Formation of Polymerization Catalyst and Polymerization in Homopolymerization Step A stirrer-equipped autoclave completely exchanged with nitrogen gas and having an internal volume of 2.0 l was charged with 2.4 mmol of triethylaluminum, 0.24 mmol of diethylaminotriethoxysilane (DEATES), and 0.0026 mmol, in terms of titanium atoms, of the solid catalyst component obtained in Example 1, to form a polymerization catalyst.

Subsequently, the autoclave was further charged with 3.2 l of hydrogen gas and 1.4 l of liquefied propylene, preliminary polymerization was performed at 20° C. for 5 minutes, and the resulting polymerization product was then heated to 70° C. in 7 minutes or less. 20 minutes after the start of the heating, 0.36 mmol of dicyclopentyldimethoxysilane (DCPDMS) was added, and the mixture was then subjected to polymerization reaction (homopolymerization step polymerization reaction) for 20 minutes to obtain a polymer (homopolypropylene).

After completion of the homopolymerization step polymerization reaction, the monomer was purged while the temperature of the reaction machine was lowered to room temperature, the mass of the entire autoclave was then measured, and the amount of polymerization in the prior step (homopolymerization step) was determined from a difference between the mass after completion of the polymerization and the mass measured before the start of the polymerization.

The same procedure as in Example 1 was carried out to determine the polymerization activity per 1 g of the solid catalyst component and the melt flow rate (MFR) of the resulting polymer. Table 2 shows the results.

(2) Production of Propylene-Based Block Copolymer

Subsequently, the autoclave was charged with hydrogen, propylene and ethylene at a molar ratio of 4:107:71 from a monomer supply line, the mixture was then heated to 70° C., and reacted under the conditions of 1.2 MPa and 70° C. while hydrogen, propylene and ethylene were introduced at a ratio of 0.09:2.4:1.6 in terms of a flow rate (l/m), and the reaction was stopped with a blocking ratio of 20 mass % to obtain a propylene-based block copolymer.

The melt flow rate (MFR), the complex viscosity η*, the flexural modulus (FM) and the molecular weight distribution (Mw/Mn) of the resulting propylene-based block copolymer were measured in the same manner as in Example 1. Table 2 shows the results.

For the resulting propylene-based block copolymer, the ethylene-propylene block copolymerization (ICP) activity (g-ICP/(g-catalyst)), the blocking ratio of the resulting propylene-based block copolymer (polymerization ratio of the copolymerization part, mass %), the xylene-soluble component (XS, corresponding to the content ratio of the ethylene-propylene copolymer (EPR) that forms the resulting propylene-based block copolymer), the intristic viscosity of the ethylene-propylene copolymer (EPR) that forms the resulting propylene-based block copolymer, the ethylene content ratio (mass %) in the ethylene-propylene-based copolymer (EPR) that forms the resulting propylene-based block copolymer, the ethylene content ratio (mass %) in the xylene-insoluble component of the resulting propylene-based block copolymer, and the IZOD impact strength of the resulting propylene-based block copolymer (at 23° C. and −30° C.) were measured by the following methods, respectively.

<Ethylene-Propylene Block Copolymerization Activity (ICP Activity) (g-ICP/(g–Catalyst·h)>

The copolymerization activity (ICP activity) per 1 hour (1 h) per 1 g of the solid catalyst component during formation of the propylene-based block copolymer was calculated from the following expression, and defined as the copolymerization step polymerization activity (g-ICP/(g–catalyst·h)).

Ethylene-propylene block copolymerization (ICP) activity (g-ICP/(g–catalyst·h))=((I(g)−G(g))/(mass (g) of solid catalyst component in olefin polymerization catalyst·h)) where I is the mass (g) of the autoclave after completion of copolymerization reaction, and G is the mass (g) of the autoclave after removal of unreacted monomers after completion of homopolypropylene polymerization.

<Blocking Ratio (Mass %)>

The blocking ratio of the resulting propylene-based block copolymer was calculated from the following expression.

Blocking ratio(mass %)={(I(g)−G(g))/(I(g)−F(g))}×100 where I is the mass (g) of the autoclave after completion of copolymerization reaction, G is the mass (g) of the autoclave after removal of unreacted monomers after completion of homopolypropylene polymerization, and F is the mass (g) of the autoclave.

<XS (Xylene-Soluble Component Content) in ICP Polymer>

A flask equipped with a stirring device was charged with 5.0 g of the propylene-based block copolymer (ICP propylene polymer) and 250 ml of p-xylene, and the block polymer was dissolved over 2 hours with the external temperature adjusted to a temperature equal to or higher than the boiling point of xylene (about 150° C.) to keep the p-xylene in the flask at a temperature equal to or lower than the boiling point (137 to 138° C.). The liquid temperature was then lowered to 23° C. over 1 hour, and an undissolved component and a dissolved component were separated by filtration. The dissolved component solution was taken, and dried by heating under reduced pressure to distill away p-xylene, the mass of the resulting residual material was determined, and the relative ratio (mass %) to the generated polymer (propylene-based block copolymer) was calculated, and defined as XS (xylene-soluble component content) in the ICP polymer.

(Measurement of Intristic Viscosity (dl/g))

For the intristic viscosity ($\eta$), three solution samples with concentrations of 0.1 g/dl, 0.2 g/dl and 0.5 g/dl were prepared by dissolving the propylene-based block copolymer in decalin at 135° C., and the reduced viscosities of the solution samples were measured using an Ubellohde type viscometer, followed by determining the intristic viscosity by an extrapolation method in which the reduced viscosities were plotted against the concentrations, and a viscosity at a concentration of 0 was extrapolated.

<Ethylene Content in Ethylene-Propylene Block Copolymer (EPR) ($C_2$inEPR)>

A flask equipped with a stirring device was charged with 5.0 g of the propylene-based block copolymer and 250 ml of p-xylene, and the block polymer was dissolved over 2 hours with the external temperature adjusted to a temperature equal to or higher than the boiling point of xylene (about 150° C.) to keep the p-xylene in the flask at a temperature equal to or lower than the boiling point (137 to 138° C.). The liquid temperature was then lowered to 23° C. over 1 hour, and an undissolved component and a dissolved component were separated by filtration.

A small amount of the dissolved component (EPR part obtained by xylene extraction) was sampled, formed into a film shape with a hot press, and the ethylene content ratio in the ethylene-propylene copolymer (EPR)(ethylene content in EPR ($C_2$inEPR), mass %) was then calculated from the absorbance and the film thickness using the following apparatus as an IR measurement apparatus.

Measurement apparatus type: Avatar manufactured by Thermonicolet

Measurement wavelength: 720 $cm^{-1}$, 1150 $cm^{-1}$

Film thickness: 0.15 (mm)

Ethylene content in EPR(mass %)=−36.437×log (D1150/D720)+31.919

(where D720 is an absorbance at a measurement wavelength of 720 $cm^{-1}$, and D1150 is an absorbance at a measurement wavelength of 1150 $cm^{-1}$.

<Ethylene Content in Xylene-Undissolved Component ($C_2$inXI)>

A small amount of the xylene-undissolved component was sampled, and formed into a film shape with a hot press, and the ethylene content in the xylene-undissolved component ($C_2$inXI) was calculated by the same method as the above-described method for measuring the ethylene content in EPR.

<Izod Impact Strength>

To the resulting propylene-based copolymer were added IRGANOX 1010 (manufactured by BASF SE) in an amount of 0.10 wt %, IRGAFOS 168 (manufactured by BASF SE) in an amount of 0.10 wt % and calcium stearate in an amount of 0.08 wt %, and the mixture was kneaded and granulated in a single-screw extruder to obtain a pellet-shaped propylene-based copolymer.

Subsequently, the pellet-shaped copolymer was introduced into an injection molding machine held at a mold temperature of 60° C. and a cylinder temperature of 230° C., and was injection-molded to form a test piece for measurement of physical properties. The test piece after the molding was conditioned for 144 hours or more in a thermostatic chamber controlled to 23° C., and the Izod impact strength of the test piece was then measured at 23° C. and −30° C. in accordance with JISK7110 "Test Method for Izod Impact Strength" using an IZOD tester (Izod Impact Tester Model A-121804405 manufactured by Toyo Seiki Seisaku-sho, Ltd.).

Test piece shape: ISO 180/4A, thickness 3.2 mm, width 12.7 mm, length 63.5 mm

Notch shape: Type A notch (notch radius 0.25 mm), formed by notched mold

Temperature condition: 23° C. and −30° C.

Impact speed: 3.5 m/s

Nominal pendulum energy: 5.5 J for measurement at 23° C., 2.75 J for measurement at −30° C.

Example 8

Except that with respect to "(1) Formation of Polymerization Catalyst and Homopolymerization Step Polymerization" in Example 7, 0.36 mmol of dicyclopentyldimethoxysilane (DCPDMS) was added 30 minutes after the start of heating to 70° C. after preliminary polymerization instead of adding 0.36 mmol of dicyclopentyldimethoxysilane (DCPDMS) 20 minutes after the start of heating to 70° C. after preliminary polymerization, the same process as in Example 7 was carried out to obtain a propylene-based block copolymer.

Various physical properties at the time of the reaction were measured in the same manner as in Example 7. Table 2 shows the results.

Example 9

(1) Formation of Polymerization Catalyst and Homopolymerization Step Polymerization A stirrer-equipped autoclave completely exchanged with nitrogen gas and having an internal volume of 2.0 l was charged with 2.4 mmol of triethylaluminum, 0.24 mmol of normal propyltriethoxysilane (nPTES), and 0.0026 mmol, in terms of titanium atoms, of the solid catalyst component obtained in Example 1, to form a polymerization catalyst.

Subsequently, the autoclave was further charged with 2.8 l of hydrogen gas and 1.4 l of liquefied propylene, preliminary polymerization was performed at 20° C. for 5 minutes, and the resulting polymerization product was then heated to 70° C. in 7 minutes or less. 30 minutes after the start of the heating, 0.36 mmol of dicyclopentyldimethoxysilane (DCPDMS) was added, and the mixture was then subjected to polymerization reaction (homopolymerization step polymerization reaction) for 10 minutes to obtain a polymer (homopolypropylene).

After completion of the homopolymerization step polymerization reaction, the monomer was purged while the temperature of the reaction machine was lowered to room temperature, the mass of the entire autoclave was then measured, and the amount of polymerization in the prior step (homopolymerization step) was determined from a difference between the mass after completion of the polymerization and the mass measured before the start of the polymerization.

The same procedure as in Example 1 was carried out to determine the polymerization activity per 1 g of the solid catalyst component and the melt flow rate (MFR) of the resulting polymer. Table 2 shows the results.

(2) Production of Propylene-Based Block Copolymer

Subsequently, the autoclave was charged with hydrogen, propylene and ethylene at a molar ratio of 4:107:71 from a monomer supply line, the mixture was then heated to 70° C., and reacted under the conditions of 1.2 MPa and 70° C. while hydrogen, propylene and ethylene were introduced at a ratio of 0.09:2.4:1.6 in terms of a flow rate (l/m), and the reaction was stopped with a blocking ratio of about 20 mass % to obtain a propylene-based block copolymer.

Various physical properties at the time of the reaction were measured in the same manner as in Example 7. Table 2 shows the results.

Comparative Example 12

Except that with respect to Example 7, the amount of hydrogen gas added in homopolymerization step polymerization was changed from 3.2 l to 2.8 l, dicyclopentyldimethoxysilane (DCPDMS) was not added during polymerization, and polymerization reaction (homopolymerization step polymerization reaction) was carried out for 40 minutes after the start of heating, the same process as in Example 7 was carried out to obtain a propylene-based block copolymer.

Various physical properties at the time of the reaction were measured in the same manner as in Example 7. Table 2 shows the results.

Comparative Example 13

Except that with respect to Example 7, the amount of hydrogen gas added in homopolymerization step polymerization was changed from 3.2 l to 9.0 l, 0.24 mmol of dicyclopentyldimethoxysilane (DCPDMS) was added instead of 0.24 mmol of diethylaminotriethoxysilane (DEATES), dicyclopentyldimethoxysilane (DCPDMS) was not added during polymerization, and polymerization reaction (homopolymerization step polymerization reaction) was carried out for 40 minutes after the start of heating, the same process as in Example 7 was carried out to obtain a propylene-based block copolymer.

Various physical properties at the time of the reaction were measured in the same manner as in Example 7. Table 2 shows the results.

Comparative Example 14

Except that with respect to Example 7, the amount of hydrogen gas added in homopolymerization step polymerization was changed from 3.2 l to 2.4 l, 0.24 mmol of normal propyltriethoxysilane (nPTES) was added instead of 0.24 mmol of diethylaminotriethoxysilane (DEATES), dicyclopentyldimethoxysilane (DCPDMS) was not added during polymerization, and polymerization reaction (homopolymerization step polymerization reaction) was carried out for 40 minutes after the start of heating, the same process as in Example 7 was carried out to obtain a propylene-based block copolymer.

Various physical properties at the time of the reaction were measured in the same manner as in Example 7. Table 2 shows the results.

Example 10

(1) Formation of Polymerization Catalyst and Homopolymerization Step Polymerization A stirrer-equipped autoclave adequately exchanged with nitrogen gas and having an internal volume of 2.0 l was charged with 2.4 mmol of triethylaluminum, 0.24 mmol of dicyclopentyldi(ethylamino)silane (DCPDEAS), and 0.0026 mmol, in terms of titanium atoms, of the solid catalyst component obtained in Example 1, to form a polymerization catalyst.

Subsequently, the autoclave was further charged with 5.3 l of hydrogen gas and 1.4 l of liquefied propylene, preliminary polymerization was performed at 20° C. for 5 minutes, and the resulting polymerization product was then heated to 70° C. in 7 minutes or less. 30 minutes after the start of the heating, 0.36 mmol of dicyclopentyldimethoxysilane (DCPDMS) was added, and the mixture was then subjected to polymerization reaction (homopolymerization step polymerization reaction) for 10 minutes to obtain a polymer (homopolypropylene).

After completion of the homopolymerization step polymerization reaction, the monomer was purged while the temperature of the reaction machine was lowered to room temperature, the mass of the entire autoclave was then measured, and the amount of polymerization in the prior step (homopolymerization step) was determined from a difference between the mass after completion of the polymerization and the mass measured before the start of the polymerization.

The same procedure as in Example 1 was carried out to determine the polymerization activity per 1 g of the solid catalyst component and the melt flow rate (MFR) of the resulting polymer. Table 2 shows the results.

(2) Production of Propylene-Based Block Copolymer

Subsequently, the autoclave was charged with hydrogen, propylene and ethylene at a molar ratio of 4:107:71 from a monomer supply line, the mixture was then heated to 70° C., and reacted under the conditions of 1.2 MPa and 70° C. while hydrogen, propylene and ethylene were introduced at a ratio of 0.09:2.4:1.6 in terms of a flow rate (l/m), and the reaction was stopped with a blocking ratio of about 20 mass % to obtain a propylene-based block copolymer.

Various physical properties at the time of the reaction were measured in the same manner as in Example 7. Table 2 shows the results.

Example 11

Except that with respect to Example 10, the amount of hydrogen gas added in homopolymerization step polymerization was changed from 5.3 l to 4.2 l, and 0.24 mmol of cyclohexylmethyldi(ethylamino)silane (CHMDEAS) was added instead of 0.24 mmol of dicyclopentyldi(ethylamino)silane (DCPDEAS), the same process as in Example 7 was carried out to obtain a propylene-based block copolymer.

Various physical properties at the time of the reaction were measured in the same manner as in Example 7. Table 2 shows the results.

Comparative Example 15

Except that with respect to Example 10, the amount of hydrogen gas added in homopolymerization step polymerization was changed from 5.3 l to 1.9 l, dicyclopentyldimethoxysilane (DCPDMS) was not added during polymerization, and polymerization reaction (homopolymerization step polymerization reaction) was carried out for 40 minutes after the start of heating, the same process as in Example 10 was carried out to obtain a propylene-based block copolymer.

Various physical properties at the time of the reaction were measured in the same manner as in Example 7. Table 2 shows the results.

Comparative Example 16

Except that with respect to Example 10, the amount of hydrogen gas added in homopolymerization step polymerization was changed from 5.3 l to 1.6 l, 0.24 mmol of cyclohexylmethyldi(ethylamino)silane (CHMDEAS) was added instead of 0.24 mmol of dicyclopentyldi(ethylamino)silane (DCPDEAS), dicyclopentyldimethoxysilane (DCPDMS) was not added during polymerization, and polymerization reaction (homopolymerization step polymerization reaction) was carried out for 40 minutes after the start of heating, the same process as in Example 10 was carried out to obtain a propylene-based block copolymer.

Various physical properties at the time of the reaction were measured in the same manner as in Example 7. Table 2 shows the results.

TABLE 2

| | Homopolymerization step | | Copolymerization step | | | | |
| --- | --- | --- | --- | --- | --- | --- | --- |
| | | | ICP | | | | |
| | Polymerization activity (g-PP/g-cat) | MFR (g/10 min) | activity (g-ICP/g-catalyst · h) | MFR (g/10 min) | Blocking ratio (mass %) | XS (mass %) | Intristic viscosity (dl/g) |
| Example 7 | 25,600 | 63 | 6,400 | 18 | 20.0 | 18.5 | 3.9 |
| Example 8 | 26,400 | 77 | 5,800 | 22 | 18.0 | 16.6 | 4.2 |
| Example 9 | 26,500 | 69 | 6,700 | 18 | 20.3 | 18.1 | 4.3 |
| Comparative Example 12 | 26,000 | 70 | 6,600 | 18 | 20.4 | 19.4 | 3.6 |
| Comparative Example 13 | 42,500 | 28 | 11,000 | 7.3 | 20.5 | 18.0 | 5.1 |
| Comparative Example 14 | 26,500 | 76 | 6,600 | 18 | 19.9 | 18.5 | 3.8 |
| Example 10 | 31,500 | 140 | 7000 | 28 | 18.1 | 16.9 | 4.8 |
| Example 11 | 26,000 | 140 | 6700 | 30 | 20.5 | 20.4 | 4.2 |
| Comparative Example 15 | 26,400 | 52 | 7300 | 14 | 21.7 | 20.4 | 3.8 |
| Comparative Example 16 | 23,500 | 49 | 5600 | 17 | 19.2 | 19.0 | 3.1 |

| | Copolymerization step | | | | | |
| --- | --- | --- | --- | --- | --- | --- |
| | Ethylene content in EPR ($C_2$inEPR) (mass %) | Ethylene content in xylene-undissolved component ($C_2$inXI) (mass %) | FM (MPa) | IZOD impact strength (kJ/m$^2$) | | Mw/Mn | Complex viscosity ratio |
| | | | | 23° C. | −30° C. | | |
| Example 7 | 36.8 | 2.3 | 1,120 | 14.2 | 6.2 | 6.7 | 17.1 |
| Example 8 | 38.8 | 2.5 | 1,180 | 12.8 | 5.7 | 6.8 | 25.8 |
| Example 9 | 35.6 | 3.0 | 1,160 | 16.5 | 6.1 | 6.3 | 28.4 |
| Comparative Example 12 | 41.1 | 3.4 | 1,070 | 15.2 | 6.6 | 6.6 | 20.7 |
| Comparative Example 13 | 31.8 | 2.1 | 1,100 | 23.2 | 6.8 | 9.3 | 32.4 |
| Comparative Example 14 | 40.3 | 3.9 | 1,040 | 15.4 | 6.8 | 7.0 | 26.5 |
| Example 10 | 33.9 | 1.9 | 1,170 | 11.5 | 4.9 | 7.9 | 18.7 |
| Example 11 | 35.5 | 2.4 | 1,070 | 13.2 | 6.2 | 9.6 | 15.9 |
| Comparative Example 15 | 35.9 | 3.2 | 940 | 17.8 | 6.6 | 7.9 | 28.1 |
| Comparative Example 16 | 37.9 | 2.9 | 970 | 14.2 | 6.3 | 6.5 | 8.4 |

It is apparent from Tables 1 and 2 that the polypropylene and propylene-based block copolymers obtained in Examples 1 to 9 each comprise a propylene initial polymerization product formed in the presence of an olefin polymerization catalyst which is a contact reaction product of an olefin polymerization solid catalyst component containing a titanium atom, a magnesium atom, a halogen atom and an internal electron donating compound, a specific organoaluminum compound, and a first external electron donating compound; and a polypropylene part formed of a propylene polymerization product formed in the presence of the olefin polymerization catalyst, and a second external electron donating compound higher in adsorption to the surface of the olefin polymerization solid catalyst component than the first external electron donating compound, and these polymers meet the following requirements: (a) the melt flow rate is 10 g/10 min to 100 g/10 min; (b) the content ratio of the xylene-soluble component is 3.0 mass % or less; and (c) the ratio of complex viscosity η* at an angular frequency of 300 radians/sec under the temperature condition of 210° C. to complex viscosity η* at an angular frequency of 0.03 radians/sec under the temperature condition of 210° C. is 8.5 or more. Thus, these polymers have a high melt flow rate (MFR), a large complex viscosity ratio, a broad molecular weight distribution Mw/Mn, and hence excellent moldability, and have a low xylene-soluble component content (XS), and hence a high flexural modulus FM and high rigidity.

On the other hand, for Comparative Examples 1 to 11, it is apparent from Table 1 that since the second external electron donating compound higher in adsorption to the surface of the solid catalyst component than the first external electron donating compound was not added to the reaction system in the process of polymerization, active sites formed, respectively, in the first external electron donating compound and the second external electron donating compound were not effectively developed, and thus the complex viscosity ratio of the resulting polymer was less than 8.5, which indicates that it was not possible to obtain a polymer (mixture of polymers) having desired linear viscoelasticity.

It is apparent from Table 2 that the propylene-based block copolymers of Comparative Examples 12 to 16 have a lower flexural modulus FM as compared to Examples 8 to 11 because the corresponding polymers have a low flexural modulus FM as shown in Table 1.

INDUSTRIAL APPLICABILITY

According to the present invention, it is possible to provide a novel olefin polymer which is excellent in lightness and moldability, has high rigidity and yields molded products excellent in flexural elasticity; and a method for easily producing the olefin polymer.

The invention claimed is:
1. A method for producing an olefin polymer, comprising:
forming a propylene initial polymerization product in the presence of an olefin polymerization catalyst which is a contact reaction product of:
an olefin polymerization solid catalyst component containing a titanium atom, a magnesium atom, a halogen atom and an internal electron donating compound, and
a preliminary polymerization step comprising adding a first external donating compound and at least one organoaluminum to the solid catalyst component;
wherein the at least one organoaluminum compound selected from compounds of general formula (I):

$$R^1_p AlQ_{3-p} \quad (I)$$

wherein $R^1$ is an alkyl group having 1 to 6 carbon atoms, Q is a hydrogen atom or a halogen atom, p is a real number of more than 0 and not more than 3, $R^1$s may be the same or different when two or more $R^1$s exist, and Qs may be the same or different when two or more Qs exist, and
wherein the first external electron donating compound is one or more organosilicon compounds having a Si—C bond and represented by the following general formula (II):

$$R^2Si(OR^3)_3 \quad (II)$$

wherein $R^2$ is a vinyl group, an allyl group, an aralkyl group, a cycloalkyl group having 3 to 12 carbon atoms, a phenyl group, or an alkylamino group having 1 to 12 carbon atoms, $R^3$ is an alkyl group having 1 to 4 carbon atoms, a cycloalkyl group having 3 to 6 carbon atoms, a phenyl group, a vinyl group, an allyl group or an aralkyl group, and $R^3$s may be the same or different, or one or more aminosilane compounds having a Si—N—C bond and represented by the following general formula (III):

$$R^4_2Si(NR^5R^6)(NR^7R^8) \quad (III)$$

wherein $R^4$ is an alkyl group having 1 to 12 carbon atoms, a vinyl group, an allyl group, an aralkyl group, a cycloalkyl group having 3 to 12 carbon atoms, or a phenyl group, $R^4$s may be the same or different, and $R^5$, $R^6$, $R^7$ and $R^8$ are each independently hydrogen, an alkyl group having 1 to 4 carbon atoms, a cycloalkyl group having 3 to 6 carbon atoms, a phenyl group, a vinyl group, an allyl group or an aralkyl group, and may be the same or different; and
further forming a polypropylene part by polymerizing propylene,
adding a second external electron donating compound to a reaction system after the preliminary polymerization step, wherein the second external electron donating compound is added in such a manner that a ratio of time for addition of the second external electron donating compound to a total polymerization time is 5 to 95%, and wherein the second external electron donating compound is higher in adsorption to a surface of the olefin polymerization solid catalyst component than the first external electron donating compound, and
wherein the resulting olefin polymer is a propylene-based block copolymer.
2. The method for producing an olefin polymer according to claim 1, wherein the internal electron donating compound is one or more selected from dicarboxylic acid esters, diethers, decarbonates, ether carboxylic acid esters or ether carbonates.
3. The method for producing an olefin polymer according to claim 1, wherein the second external electron donating compound is one or more silane compounds represented by the following general formula (IV):

$$R^9_2Si(OR^{10})_2 \quad (IV)$$

wherein $R^9$ is an alkyl group having 1 to 12 carbon atoms, a vinyl group, an allyl group, an aralkyl group, a cycloalkyl group having 3 to 12 carbon atoms, or a phenyl group, $R^{10}$ is an alkyl group having 1 to 4 carbon atoms, a cycloalkyl group having 3 to 6 carbon atoms, a phenyl group, a vinyl group, an allyl group or an aralkyl group, $R^9$s may be the same or different, and $R^{10}$s may be the same or different.
4. The method for producing an olefin polymer according to claim 1, wherein the first external electron donating compound is one or more selected from phenyltrialkoxysilanes, allyltrialkoxysilanes, cycloalkyltrialkoxysilanes, or (alkylamino)trialkoxysilanes.

5. The method for producing an olefin polymer according to claim 1, wherein the second external electron donating compound is one or more selected from diphenyldialkoxysilanes, dialkyldialkoxysilanes, phenylalkyldialkoxysilanes, di(cycloalkyl)dialkoxysilanes or (cycloalkyl)alkyldialkoxysilanes.

6. The method for producing an olefin polymer according to claim 1, wherein an amount of the second external electron donating compound added is 0.1 to 10 mol per 1 mol of the first external electron donating compound added.

7. The method for producing an olefin polymer according to claim 1, wherein a resulting olefin polymer is polypropylene.

* * * * *